US012602270B1

(12) United States Patent
Phanishayee et al.

(10) Patent No.: US 12,602,270 B1
(45) Date of Patent: Apr. 14, 2026

(54) KV-CACHE STREAMING FOR IMPROVED PERFORMANCE AND FAULT TOLERANCE IN GENERATIVE MODEL SERVING

(71) Applicant: Microsoft Technology Licensing, LLC, Redmond, WA (US)

(72) Inventors: Amar Phanishayee, Seattle, WA (US); Jakub Michał Tarnawski, Zürich (CH); Foteini Strati, Zürich (CH); Sara Jane McAllister, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 18/476,422

(22) Filed: Sep. 28, 2023

(51) Int. Cl.
G06F 9/54 (2006.01)
G06F 9/48 (2006.01)
G06F 12/0862 (2016.01)

(52) U.S. Cl.
CPC ............ G06F 9/544 (2013.01); G06F 9/4806 (2013.01); G06F 12/0862 (2013.01); G06F 2212/602 (2013.01)

(58) Field of Classification Search
CPC ..... G06F 9/544; G06F 9/4806; G06F 12/0862
USPC ........................................ 712/220
See application file for complete search history.

(56) References Cited

U.S. PATENT DOCUMENTS

2024/0411994 A1* 12/2024 Siracusano ........... G06F 40/205
2024/0420012 A1* 12/2024 Austin .................... G06N 20/00
2025/0028994 A1* 1/2025 Rathi ..................... G06N 20/00

OTHER PUBLICATIONS

Aminabadi, et al., "Deepspeed-inference: enabling efficient inference of transformer models at unprecedented scale.", SC22: International Conference for High Performance Computing, Networking, Storage and Analysis, IEEE, Jun. 30, 2022, 13 Pages.
Daniel, et al., "Achieve 23x LLM Inference Throughput & Reduce p50 Latency" Jun. 22, 2023, pp. 1-19.
International Search Report Received in PCT Application No. PCT/US2024/046287, mailed on Jan. 2, 2025, 19 pages.
Park, et al., "Improving Throughput-oriented Generative Inference with CPUs", APSys '23: Proceedings of the 14th ACM SIGOPS Asia-Pacific Workshop on Systems, Aug. 24, 2023, pp. 37-42.
Wu, et al., "Fast Distributed Inference Serving for Large Language Models", arXiv preprint arXiv:2305.05920v1, May 10, 2023, pp. 1-14.

(Continued)

*Primary Examiner* — Chun Kuan Lee
(74) *Attorney, Agent, or Firm* — NovoTechIP International PLLC

(57) ABSTRACT

A method of serving a generative transformer model includes determining a batch size to use in processing inference requests and allocating at least one prompt pipeline and at least on token pipeline to the generative transformer model to process the batch of inference requests. The number of prompt pipelines and the number of token pipelines, and the depths of the pipelines are determined based on the batch size, an average prompt length, a cache requirement per stage, and a memory footprint of model weights for the generative model per stage using a resource allocator component of the model serving system. Cache streaming is used to stream prompt cache from prompt pipelines to token pipelines to generate tokens. Cache streaming involves gather-copy operations which may be performed using compute kernels.

18 Claims, 14 Drawing Sheets

200

202

(56)     References Cited

OTHER PUBLICATIONS

"DeepSpeed", Retrieved from: https://www.deepspeed.ai/, Retrieved Date: Aug. 17, 2023, 14 Pages.

"The Ai community building the future", Retrieved from: https://huggingface.co/, Aug. 17, 2023, 10 Pages.

Jang, et al., "FasterTransformer", Retrieved from: https://github.com/NVIDIA/FasterTransformer, Jan. 23, 2023, 16 Pages.

"msr-fiddle/dejavu", Retrieved from: https://url.us.m.mimecastprotect.com/s/KZxxCv2wxzu4qRrqHziptQPUp1? domain=github.com, Jul. 14, 2024, 3 Pages.

Strati, et al., "Deja Vu: KV-cache Streaming for Fast, Fault-tolerant Generative LLM Serving", In Proceedings of the 41st International Conference on Machine Learning, 2024, 27 Pages.

Strati, et al., "Deja Vu: KV-cache Streaming for Fast, Fault-tolerant Generative LLM Serving", In Repository of arXiv:2403.01876v1, Mar. 4, 2024, 24 Pages.

* cited by examiner

Double Buffer Cache Swapping

1100

1102
Receive inference requests for a generative transformer model

1104
Determine a batch size to use in processing the inference requests

1106
Determine a number of prompt pipelines, a number of token pipelines, and depths of the pipelines based on the batch size, an average prompt length, and a memory requirement per stage 1108
Processing a first prompt through a first prompt pipeline to generate prompt output 1110
Storing the prompt output in a compute cache 1112
Streaming the prompt output from the compute cache to a first stage of a first token pipeline 1114
Processing the prompt output through the first token pipeline to generate a token output 1116
Streaming the prompt output from the token output to a persistent storage

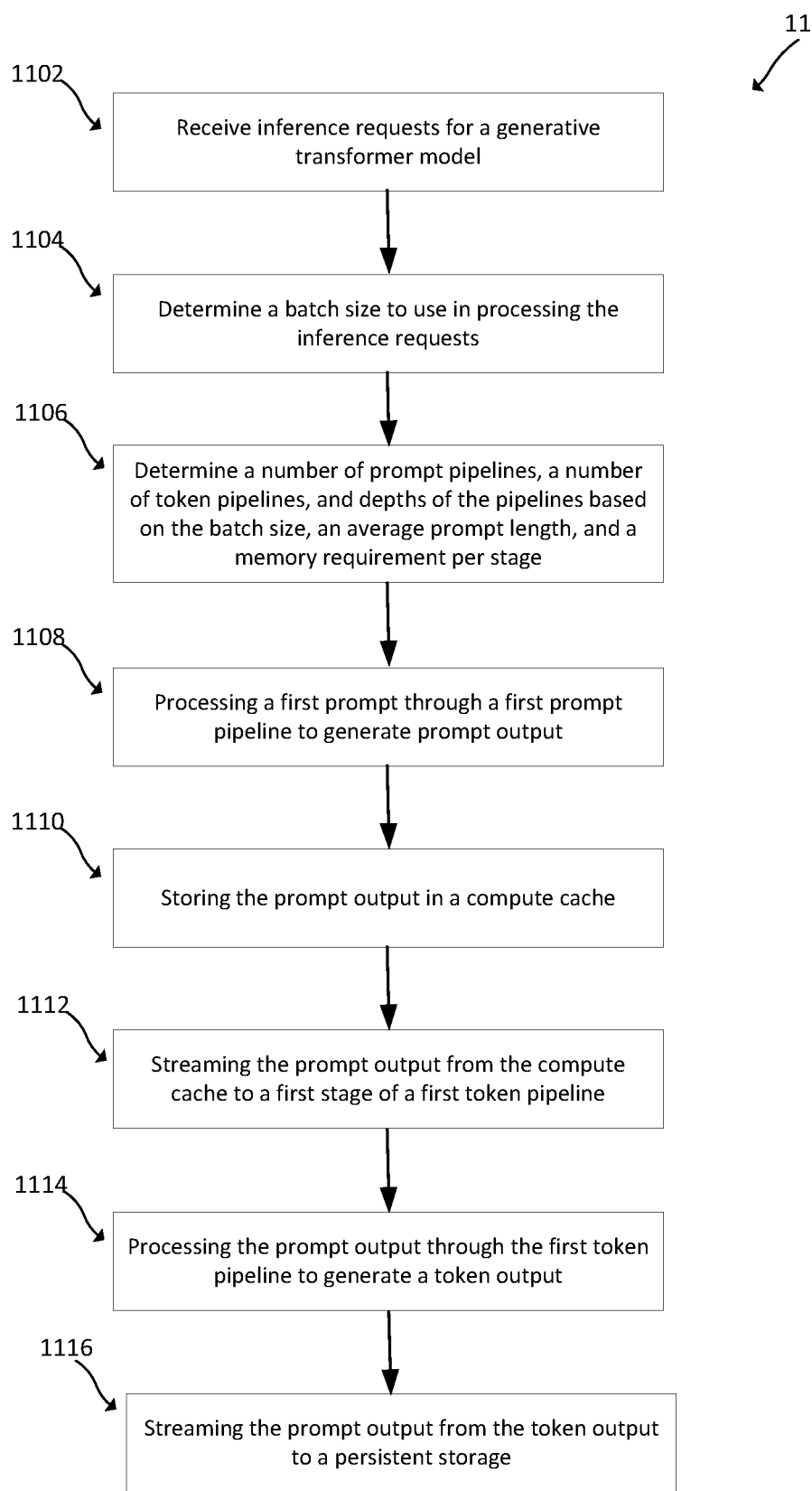

FIG. 9

KV-CACHE STREAMING FOR IMPROVED PERFORMANCE AND FAULT TOLERANCE IN GENERATIVE MODEL SERVING

BACKGROUND

Generative transformer-based model serving refers to the process of deploying and hosting generative models in a production environment to generate new content on-demand. It involves making the generative model available to users or applications in real-time, allowing them to request and receive generated outputs quickly and efficiently. Generative model serving is a crucial step to make the capabilities of generative models accessible to end-users and applications.

In generative model serving, the primary task is inference, which involves using the trained model to generate new data based on user or application input. For example, given a prompt, a text generation model might generate new sentences, or an image generation model might create new images. After training and fine-tuning a generative model, the model is deployed to a server or cloud infrastructure where it can receive inference requests and generate corresponding outputs. Inference requests for large language models (LLMs) typically involve processing a natural language prompt and generating token predictions based on the prompt.

Once a generative model is deployed, inference requests arrive continuously and must be served in real time. The memory footprint of serving large models is growing not only because of the growth in model sizes but also because of critical performance optimizations such as KV-caches that trade increased memory capacity for higher performance. Thus, current model serving systems typically distribute a generative transformer model across one or more accelerators (e.g., GPUs) using tensor and/or pipeline model parallelism. There are a number of unique challenges that are faced in distributed generative LLM serving which can impact efficiency and throughput of serving systems, such as variable latencies, component failures, inefficient utilization of memory when performing distributed model inference and inefficient model partitioning. We will cover these challenges briefly next.

First, prompt processing time is typically much higher than the processing time per token. This bimodality in processing times is a problem, especially in the context of distributed pipelined inference where stages handle both prompts and tokens because the latency of token prediction tasks for a user can be disturbed by prompt-requests of other users. Furthermore, prompt processing tasks are compute bound and token prediction tasks are memory bandwidth bound so handling them using the same components prevents appropriate optimizations that can potentially be applied to each of those task types independently to improve their performance, for example, different partitioning schemes for prompt and token processing. Second, component failures can also cause significant downtime and increased latency by having to restart failed requests. Dealing with failures in the context of LLM serving needs to consider stateful and distributed execution. Third, distributed pipelined execution requires allocating enough memory for all requests active in the entire pipeline, but on any given pipeline stage only a small portion of this allocated memory is used (corresponding to the active batch of requests being processed at that instant), effectively underutilizing memory capacity.

Hence, what is needed are inference request processing schemes that can improve the efficiency of handling prompt and token processing tasks for inference requests, that are failure and fault tolerant, use available memory effectively, and that enable optimal partitioning and reconfiguration strategies for a given model and request workload.

SUMMARY

In one general aspect, the instant disclosure presents a model serving system having a processor and a memory in communication with the processor wherein the memory stores executable instructions that, when executed by the processor alone or in combination with other processors, cause the model serving system to perform multiple functions. The function may include receiving a plurality of inference requests for a generative transformer model; determining a batch size to use in processing the inference requests; allocating a prompt pipeline and a token pipeline to the generative transformer model to process the batch of inference requests; dispatching a batch of inference requests of the batch size to the prompt pipeline; processing a first prompt from the batch of inference requests through the prompt pipeline to generate a prompt output for the first prompt; storing the prompt output in a first compute cache; streaming the prompt output from the first compute cache to a first stage of the token pipeline; processing the prompt output through the token pipeline to generate a token output for the first prompt; and outputting the token output to a result processing component of the model serving system.

In yet another general aspect, the instant disclosure presents a method of serving a generative transformer model. The method includes receiving a plurality of inference requests for the generative transformer model; storing compute values for the plurality of inference requests in an intermediate memory for a first pipeline stage; streaming the compute values for a first batch of inference requests from the intermediate memory to a cache of the first pipeline stage; processing the compute values for the first batch of inference requests at the first pipeline stage to generate new compute values for the first batch of inference requests; streaming the new compute values for the first batch of inference requests from the cache to the intermediate memory; streaming the compute values for a second batch of inference requests from the intermediate memory to the cache; processing the compute values for the second batch of inference requests at the first pipeline stage to generate new compute values for the second batch of inference requests; and streaming the new compute values for the second batch of inference requests from the cache to the intermediate memory.

In a further general aspect, the instant disclosure presents a method of serving a generative transformer model that includes storing compute values for a first batch of inference requests of the plurality of inference requests in a first memory for a first pipeline, the first pipeline corresponding to at least one transformer layer of the generative transformer model; processing the compute values for the first batch of inference requests through the first pipeline to generate new compute values for the first batch of inference requests; and while the compute values for the first batch of inference requests are being processed at the stage of the first pipeline, streaming the compute values from the first memory to a second memory or storage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 9 is a flowchart of an example method of serving a generative transformer model.

DETAILED DESCRIPTION

Figure 1:
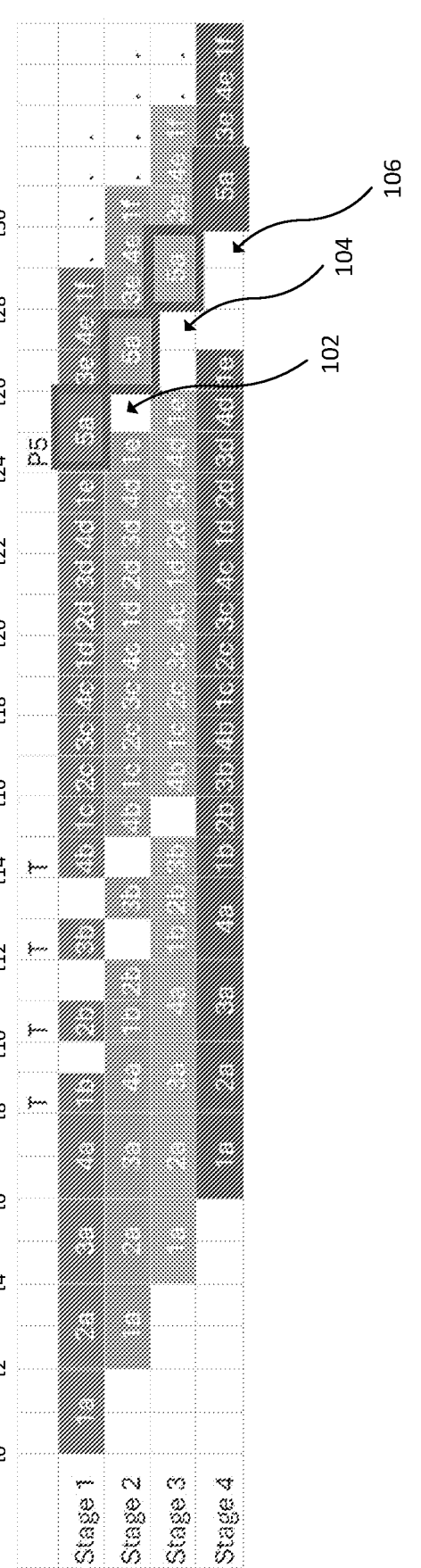
FIG. 1 shows a pipeline stage configuration for processing prompts and tokens for a generative transformer model using the same components.

Generative transformer-based models, such as Generative Pre-Trained Transformer (GPT) based Large Language Models (LLMs), are machine learning models that have a transformer architecture which has been trained on massive amounts of data to generate new content, e.g., text, images, code, and the like. The transformer architecture has been proven to be highly effective for a wide range of natural language processing tasks, such as text generation, translation, prediction, dialog systems, etc. A generative transformer model generally takes a natural language prompt as input. The prompt is processed by splitting the prompt up into a sequence of tokens (e.g., words, punctuation, etc.) which is then converted into an input embedding. An input embedding is a numerical representation (e.g., vector) which maps tokens to an embedding space which can be understood by the model. Positional encoding is included with the embedding that encodes the position of each token with respect to the other tokens in the prompt. The prompt input embedding is then provided to a transformer as an input.

A transformer is trained to predict the next token based on the tokens in the prompt (and previous token predictions) and does not consider future tokens. This is referred to as masked self-attention. The output of the transformer is a probability distribution which indicates the probabilities for a plurality of tokens being the next token in a sequence based on input prompt and any previous token predictions. The token having the highest probability is then provided the output of the transformer. The input prompt along with the current and any previous token predictions are fed back into the model as input to help predict the next token in the sequence. This approach to token prediction/generation is called autoregressive because each generated token is also used as input for generating future tokens.

Generative transformer models may use a caching mechanism to store computed values which are generated at various layers and/or stages of the transformer model that can be used in subsequent steps. For example, the transformer has a self-attention mechanism which involves calculating three vectors: a query vector, a key vector, and a value vector by multiplying the input embedding with weight matrices that are learned during training. The query vector represents the input token. The value vector includes the information in the input token, and the key vector is an indexing mechanism for the value vector.

Once the query vector, key vector, and value vector have been determined, these vectors are used to calculate "attention scores" which represent the relevance of each word in an input sequence. More specifically, the attention scores indicate the similarity between the query and each key in the sequence, resulting in a weight for each token. In practice, the values of the probability distribution are multiplied by the attention scores which effectively reduces the probability for irrelevant tokens while maintaining the values of relevant tokens. The output (i.e., the token having the highest probability) of the current token prediction iteration is used as the query for the next iteration. The keys and values are derived from the input prompt embedding and embeddings of previous token predictions. The keys and values can therefore be cached, referred to as KV caching, and provided to the transformer during the next iteration so that the keys and values for preceding tokens do not have to be recomputed.

Without KV caching, the latency per token (i.e., processing time per token) would increase as the number of tokens that need to be processed per iteration increases. This is due to the fact that for each iteration the keys and values of all preceding tokens must be computed. KV caching enables the keys and values of each iteration to be saved and reused in the next iteration which significantly reduces the computational requirements for the transformer. With KV caching the processing time per token remains almost constant, which is a significant reduction in latency relative to the case where KV caching is not used. The use of KV caching enables generative model serving to be stateful and distributed.

Once a model is deployed, inference requests may arrive continuously and must be served in real time. However, it is challenging to design a model serving system that is capable of handling high inference request rates efficiently and with low response latency. There are a number of issues faced in generative transformer model serving which can impact efficiency and performance, such as bimodal iteration latencies, failures and session restarts, and inefficient use of memory and resources. Bimodal iteration latencies refer to the difference in processing time associated with processing the initial prompt and the processing time per token. For pipelined distributed inference, longer prompt latencies of newer requests can affect per-token latencies of existing requests.

For example, referring to FIG. 1, an inference request processing scheme is shown that implements tensor and pipeline model parallelism wherein a generative transformer model is partitioned into a pipeline having four stages. Each stage represents a group of layers that could potentially be partitioned across a set of accelerators running tensor model parallel. For the purposes of this disclosure, bimodal latency is demonstrated by having prompts requiring more processing time at each stage, e.g., two units of time in this example, than the processing time of tokens at each stage, e.g., one unit of time in this example. The scheme is shown as processing four batches of prompts represented by 1a, 2a, 3a, 4a; this is the number batches required to keep a pipeline of depth 4 full in steady state. At time t0, the Stage 1 begins processing the first prompt 1a. At time t2, the Stage 1 begins processing the second prompt 2a, and Stage 2 begins processing the first prompt 1a. At time t4, the Stage 1 begins processing the third prompt 3a, Stage 2 begins processing the second prompt 2a, and Stage 3 begins processing the first prompt 1a. At time t6, Stage 1 begins processing the fourth prompt 4a, Stage 2 begins processing the third prompt 3a, Stage 3 begins processing the second prompt 2a, and Stage 4 begins processing the first prompt 1a. Once the prompts 1a, 2a, 3a, 4a have been completed, the stages are occupied with processing only tokens (e.g., 1b, 2b, 3b, 4b, 1c, 2c, 3c, 4c, etc.).

Typically, new inference requests may be added as older ones being processed in the pipeline complete. In FIG. 1, a fifth prompt 5a for a fifth inference request is added to Stage 1 at time t24 (as request batch 2 finishes at t23 on Stage 4). The processing of the fifth prompt 5a by Stage 2 cannot begin until time t26 which results in a bubble 102 being formed in Stage 2 at time t25. The bubble 102 is propagated through to Stage 3. Stage 3 cannot begin processing the fifth prompt 5a until time t28 which effectively increases the size of the bubble by causing a bubble 104 in an adjacent time slot. The bubble 104 (including bubble 102) is propagated through to Stage 4. Stage 4 cannot begin processing the fifth prompt 5a until time t30 which increases the size of the bubble again by causing a bubble 106 in an adjacent time slot. Processing prompts and tokens using the same pipeline stages can therefore cause token processing to be "disturbed" and introduce variable latency due to the longer processing times for prompts, as can be seen in FIG. 1.

Another issue faced in generative transformer model serving is failures of one or more components of the system, such as hardware or software failures in the system. In previously known systems, accelerator failure would typically result in loss of cached data for an inference request which in turn would require that all work for the inference request be redone. Component failures therefore can result in substantial delays and a corresponding reduction in throughput in model serving systems.

A final issue in large model generative serving is inefficient memory usage. Large models that mandate pipeline parallel execution require every stage to allocate enough memory for each batch of request active in the pipeline (across all the tokens that each request generates). For example, referring to FIG. 1, Stage 1 needs to allocate enough memory, not only for the model parameters it hosts, but also for all 4 active requests (cumulative memory required for prompt tasks—"a"—and token tasks—"b", "c" "d", etc.). However, when any one task is being worked on, only a fraction of the total memory allocated is used. For example, when "1d" is being processed at t19 on Stage 1, the memory reserved for request batches 2, 3, 4 is unused. This "overallocation" of memory across all active requests, can mean that supporting larger batch sizes or larger models might require more resources (e.g., stages in the pipeline) despite the fact that memory capacity for the resources already available is underutilized.

To address these technical problems, and more, in an example, this description provides technical solutions in the form of a generative transformer model serving system that is configured to process prompt and tokens in separate pipelines, and to determine the appropriate number of prompt pipelines and token pipelines, as well as depths (i.e., number of stages) of each pipeline based on their memory requirements, including cache requirements, of the model. The system utilizes compute cache (e.g., KV cache) streaming to enable cache transfers between prompt and token pipelines during inference. Cache streaming is also used to improve fault tolerance and recovery times by streaming token cache to remote memory or persistent storage. An inference request for a generative transformer model includes a prompt processing and token processing tasks. Prompt and token processing tasks are typically performed by distributing the model over one or more accelerators and partitioning the model into one or more pipeline stages. Compute cache streaming enables disaggregation of prompt processing and token processing pipelines for inference requests. In other words, the generative model serving system includes at least one prompt processing pipeline that is used solely for prompt processing and at least one token processing pipeline that is used solely for token processing.

Prompt pipelines are compute dominated and typically have small batch sizes (e.g., number of prompts). Each prompt pipeline has one or more pipeline stages which correspond to different layers in the generative transformer model. Each prompt pipeline maintains a prompt compute cache (e.g., KV cache) which receives the computed prompt values as the prompt is processed through the prompt pipeline. Once a prompt has been processed through the last stage of the pipeline, cache streaming is used to stream the prompt cache to the token cache for a token processing pipeline. Prompt cache streaming does not have to wait for prompt processing to be completed. Prompt cache streaming can be performed on a per layer or per stage basis such that data that is written to the prompt cache is streamed to the token cache at the completion of each stage/layer. Fine-grained overlapping of streaming transfers with prompt computation is therefore achieved.

Token processing pipelines handle all token inferencing. These pipelines are memory bandwidth dominated. Different token pipelines can have different batch sizes, and this batch size can also be different from the prompt pipeline batch size for various reasons, such as desired quality of service (QoS) level. The token pipeline iteratively generates tokens, and the processing of each token results in the generation of a corresponding token cache. The computed values which are generated during each iteration of the token pipeline are added to the token cache to be included in the input for the next iteration.

Cache streaming is performed as tokens are generated to stream the token cache to remote memory and/or persistent storage to protect against component failure and enable fast fault recovery. Remote memory refers to the memory of a component or device which is located separately, or remotely, from the component or device where token processing is currently taking place. Persistent storage refers to non-volatile storage, such as hard disk, hard drives, and the like. After each token is generated, the token cache is streamed to remote memory or persistent storage to protect against faults and failures that could result in the token cache being cleared or becoming corrupted. On a fault or failure, resulting in the token cache becoming cleared or corrupted, the token cache saved in the remote memory or persistent storage can be streamed back to the token cache. Once inference processing is resumed, the token pipeline can begin processing the token cache for the last generated token rather than having to start the whole process over. This significantly decreases the amount of time needed for recovery relative to previous model serving systems.

Cache streaming also enables more efficient memory usage during inference processing. As noted above, previous model serving systems allocated memory to each pipeline stage for each batch of requests active in the pipeline. For example, if there were four batches of requests active in the pipeline, the total memory allocated to cache for a pipeline stage would be enough to support all four batches. However, while one batch is being processed in a pipeline stage, the memory allocated to the other batches in that pipeline stage is not being actively used. This results in inefficient usage of the memory. To improve the efficiency of memory usage, a separate memory, such as the local CPU's memory, is designated as an intermediate storage for hosting the compute cache. The intermediate storage has sufficient space to hold the token cache for each batch at each stage of the pipeline. At the completion of each stage, cache streaming is used to stream the token cache generated by the current stage from the compute cache for the pipeline to the intermediate storage, and, before the next stage begins, cache streaming is used to stream the token cache for the next stage from the intermediate storage to the compute cache for the pipeline. This enables the same compute cache to be utilized to process each batch. In other words, separate memory does not have to be allocated for each batch so less memory is required for the compute cache relative to previous model serving systems.

Because less memory overall is required for the compute cache, the memory allocated to compute cache for per-batch processing can be increased to enable larger batch sizes if needed or desired. The technical solutions described herein address the technical problem of inefficiencies and difficulties in generative transformer models related to prompt and token processing. The solutions include a compute cache streaming strategy that enables prompt and token pipeline disaggregation which in turn improves processing time consistency and prevents increased latency that could otherwise be caused when processing prompts and tokens together in the same pipelines. The compute cache streaming also enables fault tolerance and recovery times to be improved by using cache streaming to stream token caches to remote memory or persistent storage so that pipeline states can be maintained and restored in the event of failure. Compute cache streaming also enables improved cache management and more efficient memory utilization by enabling the token cache for each batch at each stage to be swapped out of the accelerator cache to intermediate storage (e.g. in CPU memory) when the batch is not being actively processed by a pipeline stage and swapped back to accelerator memory when the batch is to be processed by a pipeline stage.

Figure 2:
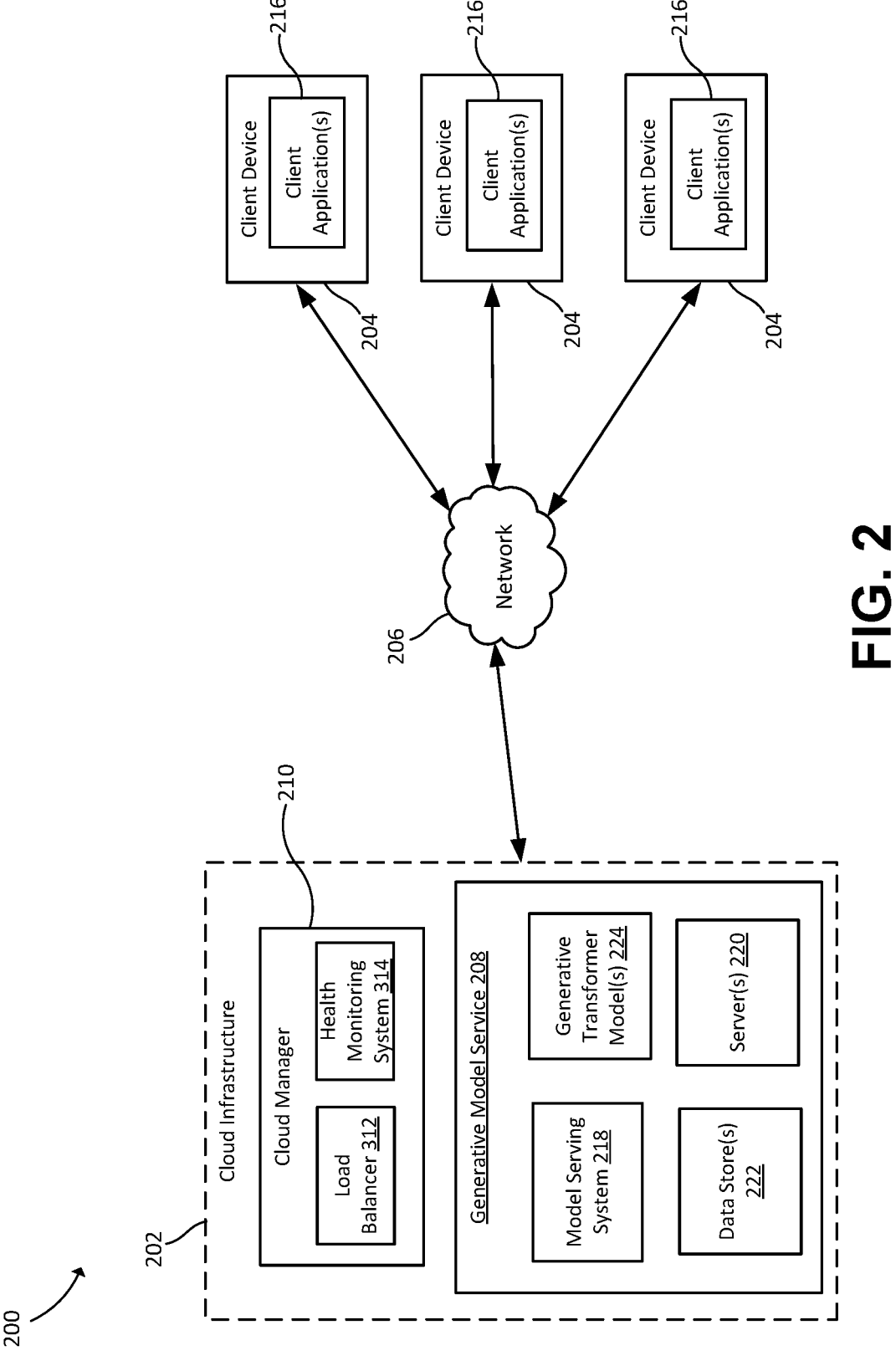
FIG. 2 is a diagram showing an example computing environment in which the techniques disclosed herein are implemented.

FIG. 2 is a diagram showing an example computing environment 200 in which aspects of the disclosure may be implemented. Computing environment 200 includes cloud infrastructure 202, client devices 204, and a network 206. The network 206 includes one or more wired and/or wireless networks. In embodiments, the network 206 includes one or more local area networks (LAN), wide area networks (WAN) (e.g., the Internet), public networks, private networks, virtual networks, mesh networks, peer-to-peer networks, and/or other interconnected data paths across which multiple devices may communicate.

The cloud infrastructure 202 is configured to provide one or more cloud computing services and/or distributed computing services, including a DNN service 208, to users over the network 206. Cloud infrastructure 202 may provide other services, such as hosting applications, user authentication, file storage, system updates, and the like. Cloud infrastructure 202 includes one or more DNN servers 220 provide computational and storage resources for the DNN service 208 including the servicing of one or more DNNs 224. DNN servers 220 are implemented using any suitable number and type of physical and/or virtual computing resources (e.g., standalone computing devices, blade servers, virtual machines, etc.). Cloud infrastructure 202 may also include one or more data stores 222 for storing data, programs, and the like for implementing and managing the DNN service 108.

Cloud infrastructure 202 includes a cloud manager 210 for managing various aspects of the cloud infrastructure, such as deploying, configuring, and managing physical and/or virtual machines. Cloud manager 210 includes a load balancer 212 for distributing requests and workloads among server farms and/or among servers of a server farm. The load balancer 212 utilizes parameters such as load, number of connections, and server performance, to determine where to distribute the requests and workloads. Cloud manager 310 also includes a health monitoring system 314 configured to monitor the health of physical and virtual resources. and identify faulty components so that remedial action can be taken.

Client devices 204 enable users to access the services provided by the cloud infrastructure 202 via the network 206, such as the DNN service 208. Client devices 204 can be any suitable type of computing device, such as personal computers, desktop computers, laptop computers, smart phones, tablets, gaming consoles, smart televisions and the like. Client devices 204 include one or more client (software) applications 216 that are configured to interact with services made available by cloud infrastructure 202. In so embodiments, client applications 216 include dedicated applications installed on the client device and programmed to interact with one or more services provided by cloud infrastructure. In other embodiments, client applications 216 include general purpose applications, such as a web browser, configured to access services over the network 206.

Figure 3:
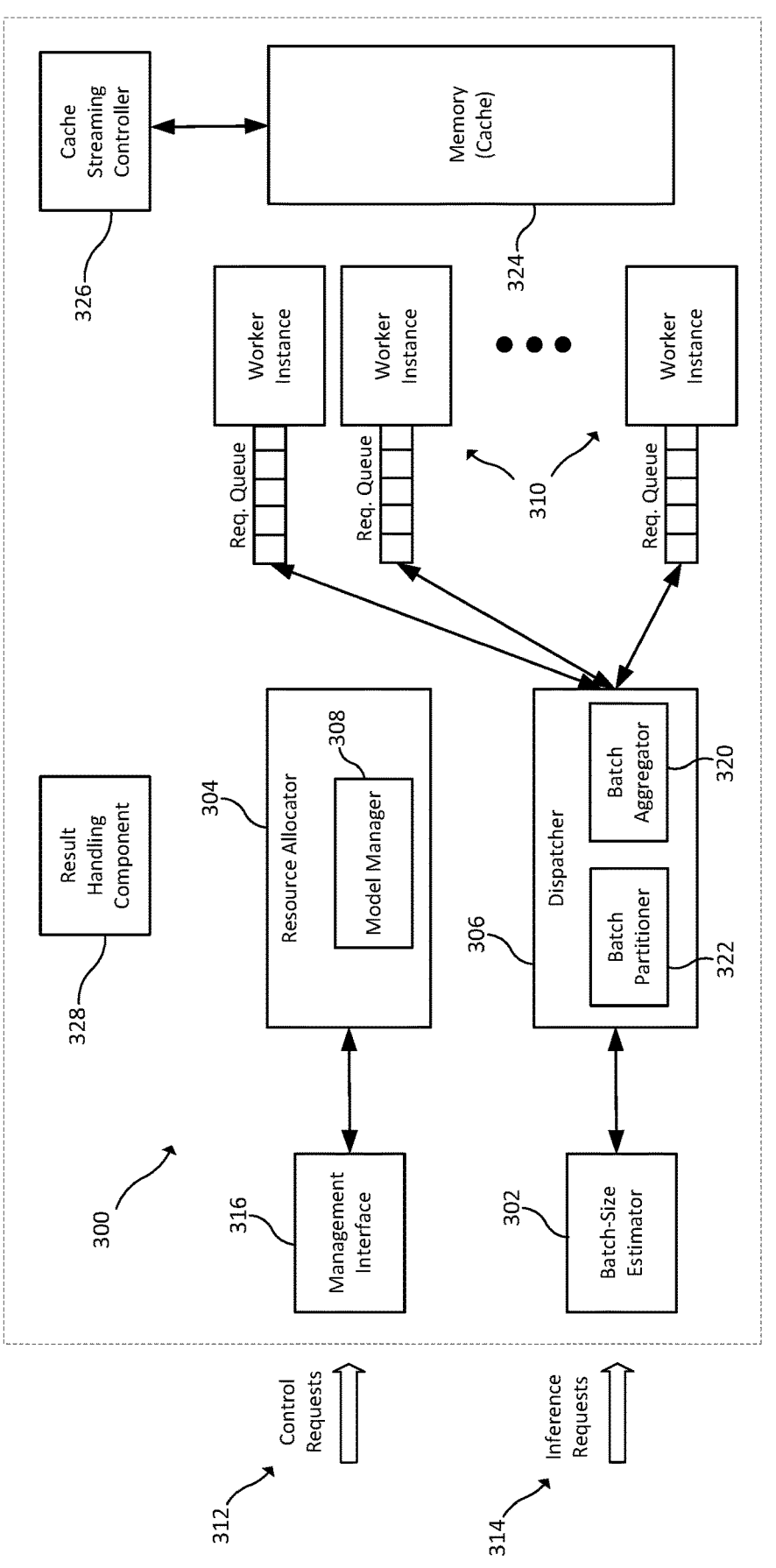
FIG. 3 is a diagram of a model serving system which may be implemented in the computing environment of FIG. 1.

In accordance with the disclosure, cloud infrastructure includes a model serving system 218 for the generative transformer model service 208 for processing inference requests, allocating resources, cache management, cache streaming, and the like. An example implementation of a generative model serving system 300 is shown in FIG. 3. The system 300 includes a batch-size estimator 302 component, a resource allocator component 304, a dispatcher component 306, a model manager component 308, and worker instances 310. The batch-size estimator component 302 estimates the batch size for inference requests that is currently being used by the model serving system. The batch size is a configuration parameter for the model serving system that is used to set various operating characteristics of the model serving system. The model serving system sets a batch size for the system based on a number of factors, such as rates that inference requests are received, queue size for inference requests, number of requests in the queue, forecasted rates/patterns of requests, and the like. The resource allocator component 304 interacts with the dispatcher component 306 and the worker instances 310 and allocates resources to the instances 310 based at least in part as batch size. The resource allocator component 304 can allocate resources to the instances 310 in a round robin fashion. The compute resources for each instance are statically allocated at the time of instance creation and do not change at runtime.

The dispatcher component 306 handles two types of requests: (1) management/control requests 312 and (2) inference requests 314. The dispatcher's management interface 316 handles control messages 312, such as requests to register a new model and those to create and delete instances of any of the registered models. Model manager component 318 manages the storage of models and loads/picks the models which have been requested to be served. The model manager component 318 may also allocate machines to models and maintain mappings of machines to models.

Dispatcher component 306 dispatches inference requests 314 to worker instances 310. The dispatcher component 306 handles both batch aggregation 320 and batch partitioning 322 of the requests. Batch aggregation is done per model and batch partitioning is done per instance. Batch aggregation 320 may use a user-provided batch timeout value, and request that aggregation be performed until the timeout expires. If the timeout expires before the batch size is reached, the dispatcher component 306 simply dispatches the current batch to the instances. The batch size estimator 302 component triggers a configuration change if batch timeouts happen too frequently. However, instance reconfiguration is time consuming and is done conservatively.

Each worker instance 310 is responsible for executing an inference batch for a given model. Each worker instance 310 executes a user-provided handler over a batch of requests. A handler takes the batch of requests as input and returns the batch of responses. During the handler initialization, a worker instance 310 might need to load the model into the memory. Users may also specify any optimizations to use during model initialization. Each handler mainly consists of three parts: (1) Pre-processing, (2) Inference and (3) Post-processing. Pre-processing and post-processing are executed before and after inference. Inference is executed by a framework (e.g., PyTorch). Pre-processing usually involves data transformations. For example, pre-processing for an image classification model can involve decoding the image, resizing it to a fixed size, and transforming it into the right format for the model. Post-processing usually converts the output of the inference into user-understandable format. For example, for a computer vision model, post-processing can be the conversion of the output tensor to a list of labels.

The system 300 includes a memory 326 which is used to implement a cache for the worker instances 310. In various implementations, each accelerator includes memory that can be allocated to the cache for worker instances. The memory 326 can be divided among worker instances and used for pipeline caching, e.g., prompt cache, token cache, etc., or any other suitable type of caching depending on the how the worker instances 310 are utilized. As noted above, the model serving system is configured to implement cache streaming which enables the compute cache, e.g., KV cache, to be streamed between different memory locations, such as streaming prompt cache to token cache (for disaggregation of prompt and token pipelines) streaming token cache to and from a remote memory or persistent storage (for fault tolerance and improved recovery times), streaming token cache between intermediate storage and compute cache for cache swapping (for improved memory utilization), and optimized pipelined streaming of prompt and token cache (for improved latency). The system 300 includes a cache streaming controller 326 which is configured to manage and control the prompt cache and token cache streaming for the system. The output generated in response to inference requests is returned as results to a result handling component 328 which processes the results so they can be returned to the appropriate source.

The resource allocator 304 is configured to allocate resources for processing inference requests received by the system. Inference requests are processed by selecting numbers of prompt pipelines and token pipelines to utilize to process inference requests as well as the number of stages to implement in each pipeline. In various implementations, the resource allocator 304 is configured to algorithmically determine how to partition a given generative transformer model by determining the number of prompt pipelines and depth of prompt pipelines (i.e., number of stages) as well the number of token pipelines and the depth of token pipelines (i.e., number of stages) to use for the model. The system is configured to determine these parameters algorithmically. The algorithm determines the number of prompt pipelines (P), the number of token pipelines (T), the depth of the prompt pipelines ($P_d$) and the depth of the token pipelines ($T_d$) for a given model and takes the memory capacity requirements, including the cache requirements, of the model into consideration in determining the partitioning scheme.

The algorithm uses a number of variables and assumptions. For example, given a maximum of X of servers, there are G GPUs and each GPU has memory capacity of m GB. Tensor model parallelism (TMP) is used across all G GPUs within a machine, and total memory M available corresponds to G*m. It is assumed that a sufficient and consistent volume of inference requests so that there are always requests to serve. A batch size estimator is used to determine the steady state batch size (B), and both prompt and token pipelines will use the same batch size so that prompt batch size $P_b$=token batch size $T_b$=B. A model has L layers, and an aggregated memory footprint of model weights W. A maximum sequence length corresponds to the average prompt length plus the average number of generated tokens per prompt. The total memory requirement (M) for a prompt pipeline is a sum of the total cache requirement (C) and the total memory footprint of model weights (W) for the pipeline, i.e., M=C+W. For a pipeline having i stages, the total cache requirement (C) is the sum of the cache requirement per stage ($C_i$) for all stages ($P_d$), i.e., $$C = \sum_{P_d}^{i=1} C_i.$$

Similarly, the total memory footprint of model weights (W) for a pipeline is the sum of the model weight per stage ($W_i$) for all stages ($P_d$), i.e., $$W = \sum_{P_d}^{i=1} W_i.$$

The total number of prompt pipelines P and prompt pipeline depth $P_d$ used for the model depends on the cache capacity needed at each stage i to process a batch size B of prompts. This cache capacity depends batch size B, the average prompt length, and the memory footprint of model weights used by the model in processing each prompt. The cache requirement per stage Ci in turn depends on the number of transformer layers in each stage. A model has a predetermined number of transformer layers (L) which will be divided between the stages of the prompt pipeline so that each pipeline stage has a number of transformer layers $L_i$. The memory footprints of model weights for each transformer layer ($W_L$) are known parameters for the system. The output of each transformer layer is typically stored in the compute cache. Therefore, the cache requirements for a model depend primarily on the cache requirements per layer. It is assumed that all transformer layers L are the same, and the embedding layer's memory and runtime characteristics are ignored. Therefore, the cache requirement per layer $C_L$ is a function of the batch size (B), the average prompt length (prompt_length), and the memory footprint of model weights per layer ($W_L$). For example, the batch size B sets the number of prompts to be processed at each layer, and the average prompt length determines the number of tokens per prompt for which computed values are generated at each layer. The memory capacity per token ($M_T$) used to store each computed value is generally a known parameter of the system. The cache requirement per transformer layer ($C_L$) therefore may be determined by $C_L = B*prompt\_length*M_T$.

The memory requirement per stage $M_i$ for a stage having $L_i$ transformer layers must be greater than or equal to the sum of the cache requirement per layer and memory footprint of model weights per layer, i.e., ($C_L + W_L$), times the number of transformer layers in the stage, i.e., $M_i \geq L_i*(C_L + W_L)$. Solving for $L_1$ enables a determination as to the number of transformer layers per stage $L_i$ for a prompt pipeline. For example, the maximum number of transformer layers per stage for a prompt pipeline can be determined using the following formula:

$$L_i = \text{floor}\left(\frac{M_i}{C_L + W_L}\right).$$

Once the maximum number of transformer layers per stage $L_i$ is determined, the maximum number of stages ($P_d$) to use for a prompt pipeline can be determined by $P_d = \text{ceil}(L/L_i)$, and the formula $L_i = L/P_d$ can be used to evenly divide layers across stages.

The number of token pipelines T and token pipeline depth $T_d$ to use for the model depends primarily on the cache capacity needed to process a single token across a single batch and therefore is a function of batch size (B) and the memory footprint of model weights $W_i$ used by the model to process each token at each stage, i.e., $k_i = f_i(W_i, B)$. The total memory footprint of model weights for W is given by $$W = \sum_{T_d}^{i=1} W_i.$$

For t tokens in a batch, the total cache capacity $K_i$ per batch is given by $K_i = k_i*t$. The number of batches to keep the token pipeline full corresponds to the stages per pipeline, i.e., pipeline depth $T_d$. The total cache needed for $T_d$ batches is therefore equal to $K_i*T_d$, and the total cache for Td batches along with the prompt cache is $(K_i*T_d)+(C_i*T_d)$. For $T_d$ stages, the total memory requirement per stage ($M_i*T_d$) must be greater than or equal to the total memory footprint of model weights W plus the sum $(K_i*T_d)+(C_i*T_d)$ for each stage $T_d$, i.e., $$(M_i * T_d) \geq W + \sum_{T_d}^{i=1} ((K_i * T_d) + (C_i * T_d)).$$

For each stage i in the stages $T_d$, $M \geq (K_i*T_d)+W_i+(C_i*T_d)$.

Similar to the prompt pipeline, assume $K_L$ is the cache footprint of one transformer layer for t tokens for a single batch of size B, and $W_L$ is the memory footprint of model weights of one transformer layer. If we have $T_n$ layers in every stage $T_d$, then $((K_i*T_d)+W_i+(C_i*T_d))=(T_n*((K_L*T_d)+W_L+(C_L*T_d))$, and the memory requirement per layer is $M_L \geq T_n*((K_L*T_d)+W_L+(C_L*T_d))$. The token pipeline depth is given by $T_d = L/T_n$, so $M \geq ((C_L+K_L)*L)+(T_n*W_L)$. The maximum number layers per stage $T_n$ may then be given by the formula:

$$T_n = \text{floor}((M-((C_L+K_L)*L))/W_L).$$

Once the maximum number of transformer layers per stage is determined, the maximum number of stages ($T_d$) to use for a token pipeline can be determined by $T_d = \text{ceil}(L/T_n)$, and the formula $T_n = L/T_d$ can be used to evenly divide layers across stages.

There are constraints which can be used to ensure that the number of prompt pipelines, number of token pipelines, and pipeline depths are kept within the capabilities of the system. For example, $(P*P_d)+(T*T_d)$ must be less than the maximum number of servers X. Another constraint may be defined where, if one prompt pipeline can feed r token pipelines, $P/T = 1r$.

Compute cache streaming is used to stream prompt cache from a compute cache (e.g., KV cache) for a prompt pipeline to a token cache for a token processing pipeline to generate tokens for the prompt. Prompt cache streaming does not have to wait for prompt processing to be completed. Prompt cache streaming can be performed on a per layer or per stage basis such that data that is written to the prompt cache is streamed to the first token processing pipeline at the completion of each stage/layer. Fine-grained overlapping of streaming transfers with prompt computation is therefore achieved. Token processing pipelines handle all token inferencing. These pipelines are memory bandwidth dominated and can have a large batch size (i.e., number of tokens to generate). To avoid possible bubbles, the batch size may be kept constant. Different token pipelines can have different batch sizes, and this batch size can also be different from the prompt pipeline batch size for various reasons, such as desired quality of service (QoS) level. Cache streaming is done on a per-token basis. Once a token has been generated and cached, the cached token is streamed to the next token processing pipeline to use as an input.

Figures 4A, 4B:
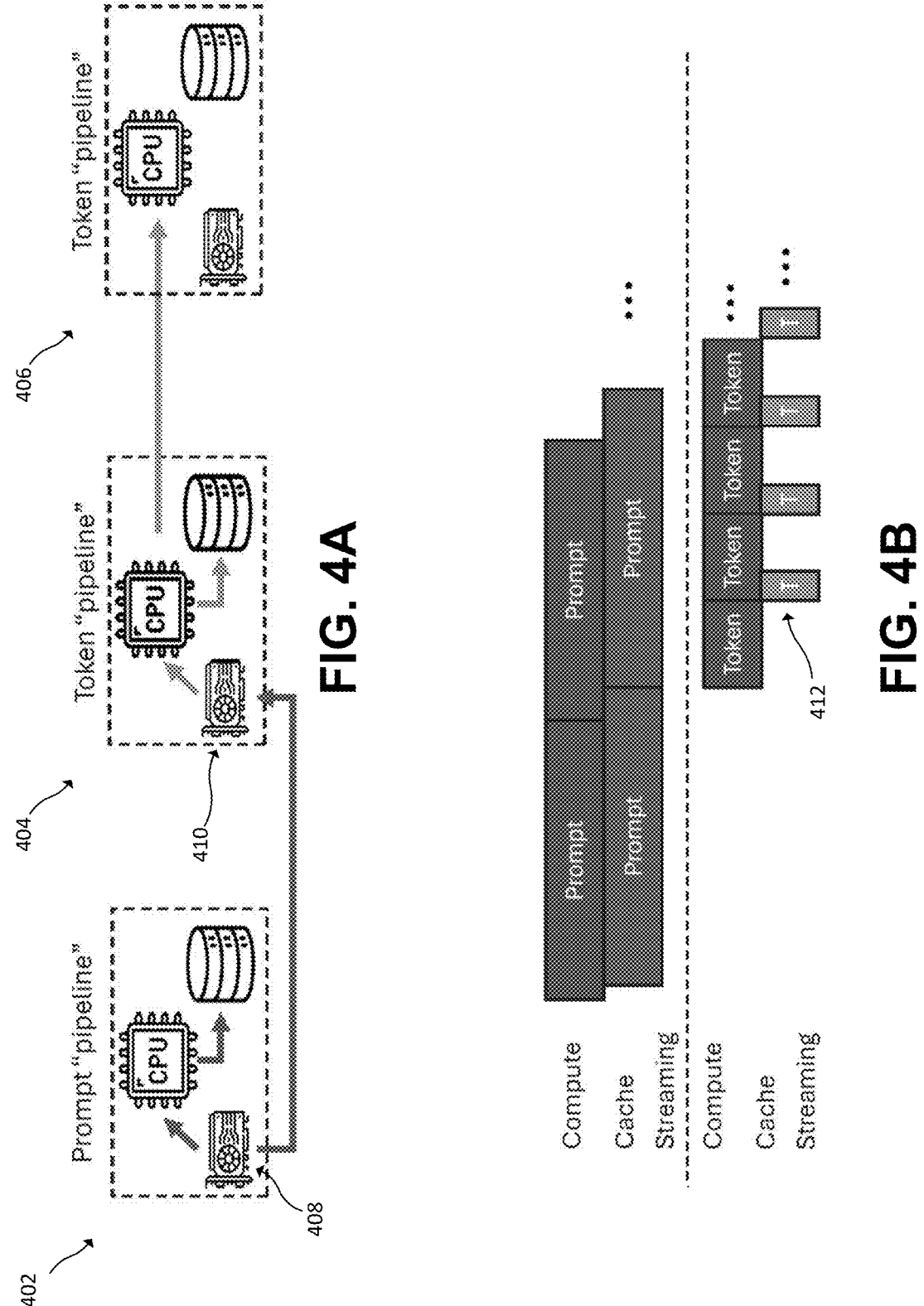
FIG. 4A is a schematic diagram showing examples of how cache streaming can be used for dedicated prompt and token pipelines.
FIG. 4B shows an example of the timing of cache streaming for the example of FIG. 4A.
Figure 4C:
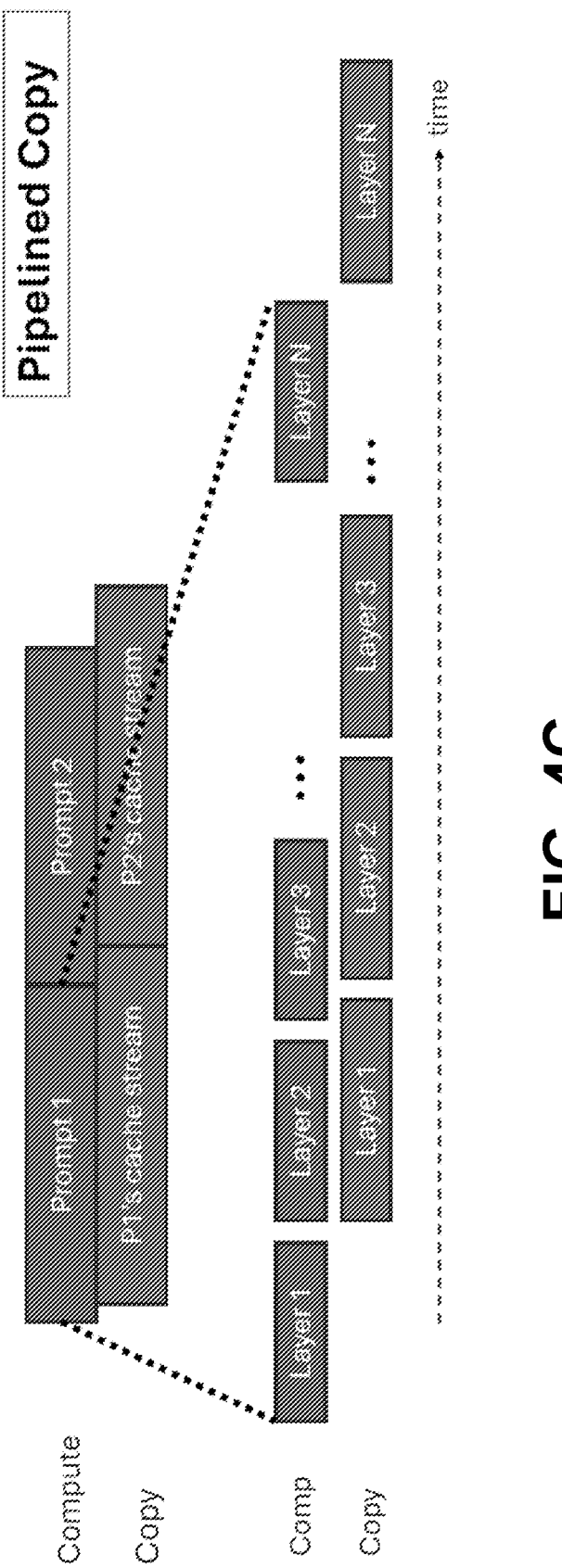
FIG. 4C shows how prompt cache streaming is performed on a layer-by-layer basis.

Compute cache streaming is utilized to enable separation of prompt pipelines and token pipelines. FIGS. 4A-4C show simplified examples of how cache streaming is used with separate prompt and token processing pipelines. FIG. 4A shows a prompt pipeline 402 implemented by a first accelerator (e.g., GPU) 408, a first token pipeline 404 implemented by a second accelerator 410, and a second token pipeline 406. Tensor and pipeline model parallelism may be used in each of the accelerators to partition a generative transformer model into a plurality of pipeline stages for each pipeline. Each pipeline stage may correspond to a different transformer layer or block of the generative transformer model. Cache streaming is used to stream computed prompt values from a compute cache of the first accelerator 408 for the prompt pipeline 402 to a token cache of the second accelerator 410 for the token pipeline 404. Cache streaming is also used to stream the token cache from token pipeline 410 to separate storage. In FIG. 4A, the separate storage is a replica 406 of the token pipeline 404. The token cache can be streamed to the CPU memory for backup purposes and/or for cache swapping purposes.

Cache streaming enables optimized pipelined streaming of the compute cache (e.g., KV cache) by allowing cached values to be streamed from the cache to other locations while the cache is being used for computations in a pipeline. Examples of such optimized pipelined streaming are shown in FIGS. 4B and 4C. FIG. 4B shows how pipelined streaming is implemented for token processing. Cache streaming is performed to stream the output of a prompt pipeline to a token cache for the token pipeline. The token pipeline uses the token cache to generate the first token. The computed values for the first token are added to the token cache to be included in the input to the token pipeline to generate the next token. As the token pipeline is processing the token cache to generate the next token, the token cache is streamed to remote memory and/or persistent storage for fault recovery. This occurs as each token is being generated so that the token cache that is stored in the remote memory or persistent storage is for the most recently generated token.

FIG. 4C shows an example of optimized pipelined streaming for prompt pipelines. Cache streaming in the case of the prompt cache does not have to wait until a prompt has been processed through all the layers of the model. In FIG. 4C, a prompt pipeline implements N layers of a generative transformer model. Each layer generates an update to the prompt cache. After the completion of the first layer, Layer 1, the prompt cache is updated with the output of the first layer. At this point, the second layer, Layer 2, can begin processing the prompt cache. At the same time, the streaming of the cache generated by Layer 1 can begin the token pipeline. Similarly, once Layer 2 has completed processing, Layer 3 can begin processing. The streaming of the cache of Layer 2 can begin after the computation of Layer 2 has completed.

Figure 5:
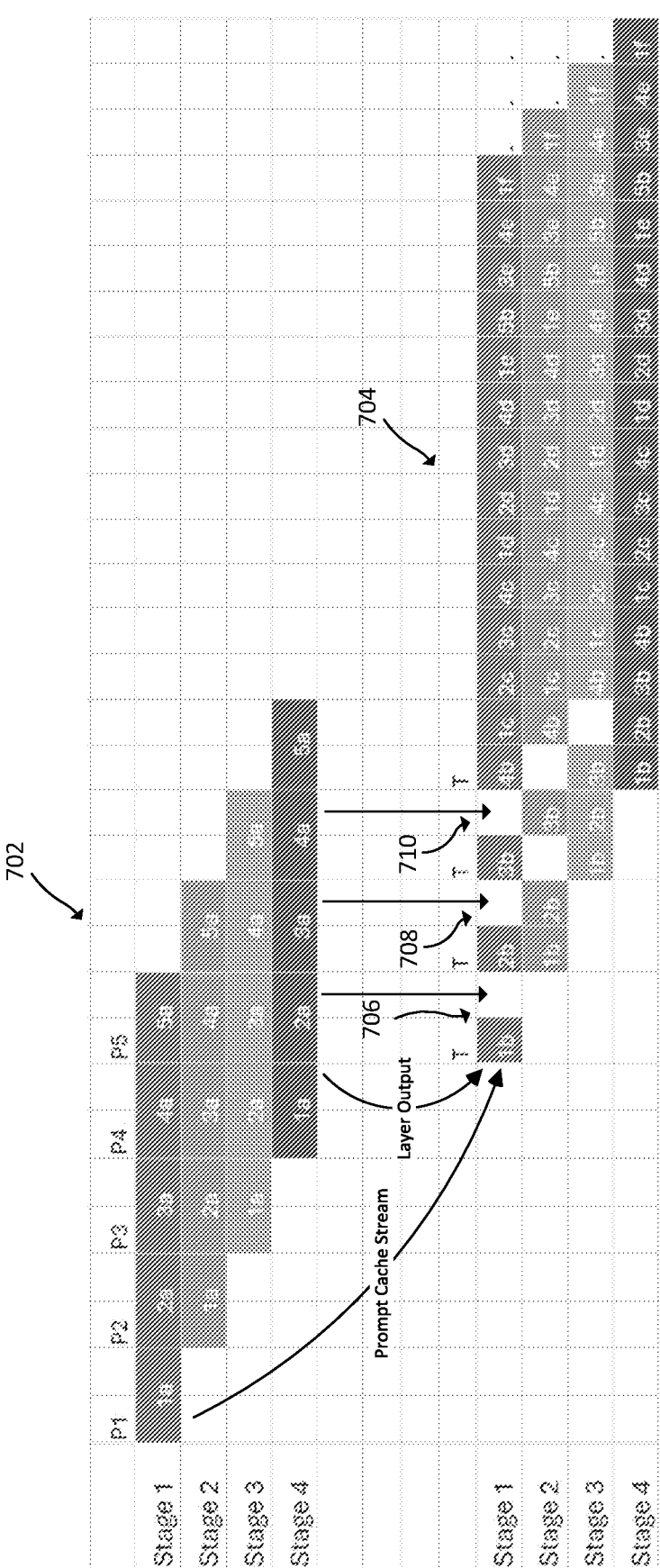
FIG. 5 shows an example of how a dedicated prompt pipeline and a dedicated token pipeline would handle the inference requests from FIG. 1.

FIG. 5 shows how the disaggregation of prompt and token pipelines eliminates disturbances and the resulting variable latency in token processing. In FIG. 5, the inference requests are processed with a dedicated prompt pipeline 702 and a dedicated token pipeline 704. The diagram of FIG. 5 is similar to FIG. 1 in that batches 1a, 2a, 3a, 4a, and 5a are processed through the pipelines. Once the batch 1a has been processed through Stage 4 of the prompt pipeline 702, the output of Stage 4 of the prompt pipeline 702 is streamed to Stage 1 of the token pipeline 704 to begin generating tokens for the inference request. Because the process time for prompts is longer than the process time for tokens, a bubble 706 is introduced into Stage 1 after token 1b while prompt 2a is still being processed by the prompt pipeline 702. Similarly, bubbles 708, 710 are introduced while prompts 3a and 4a are being processed in by the prompt pipeline 702. These bubbles are unavoidable due to the difference in processing times. However, because the token pipeline 704 only processes tokens, there are no bubbles introduced by adding later arriving prompts, such as prompt 5a. The latency of the token pipeline 704 therefore should be substantially consistent over time. Utilizing separate prompt and token pipelines therefore prevents the variable latency that can result from processing prompts and tokens of inference requests with the same pipeline, such as in FIG. 1.

As can be seen in FIG. 5, as the prompt pipeline begins processing the first batch 1a at Stage 1, the prompt cache is streamed to the token cache for Stage 1 of the token pipeline. The output of Stage 4 of the prompt pipeline corresponds to the output of a layer of the generative transformer model. Therefore, once Stage 4 of the prompt pipeline has completed processing 1a, Stage 1 of the token pipeline can take over processing tokens for request 1.

Figure 6A:
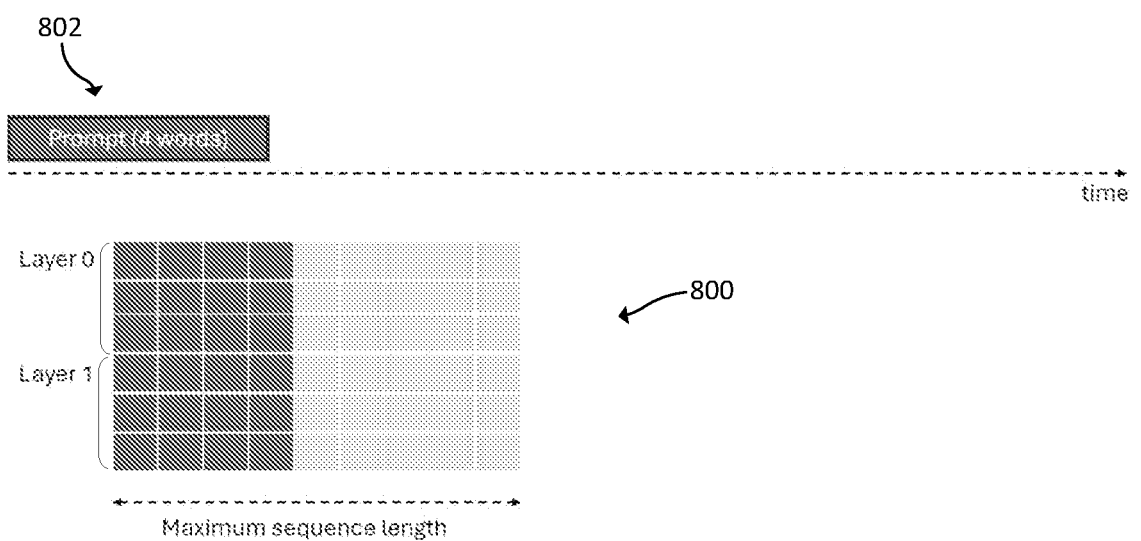
FIG. 6A shows an example layout of a compute cache after a prompt has been processed through a prompt pipeline and computed values for the prompt have been cached in a compute cache.
Figure 6B:
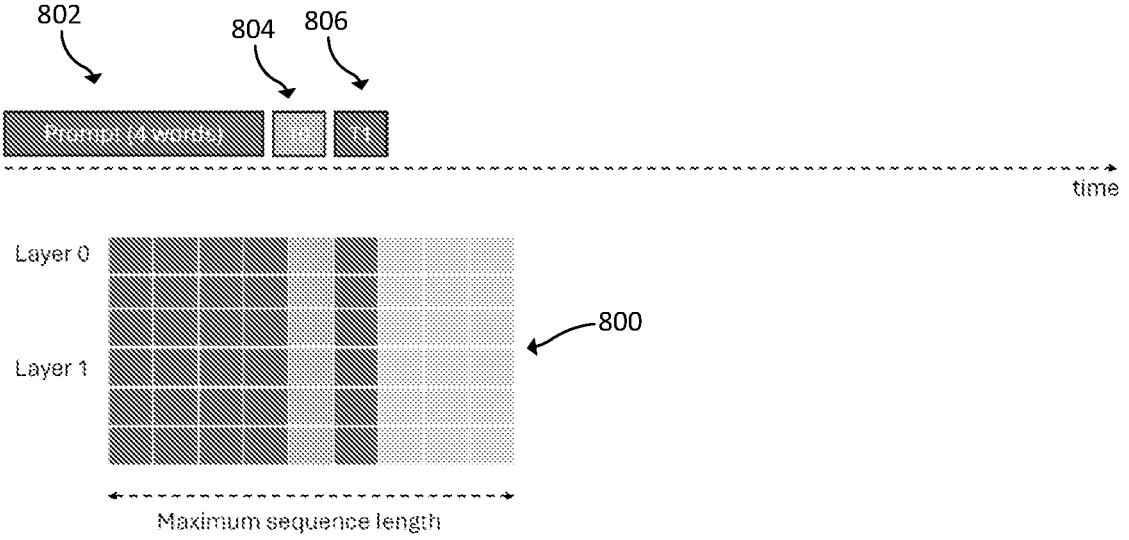
FIG. 6B shows the example layout of FIG. 6A after tokens have been generated based on the prompt and computed values for the tokens that have been appended to the compute cache.

FIGS. 6A and 6B show an example cache layout for a compute cache 800. In various implementations, the compute cache 800 corresponds to a KV cache of a generative transformer model. In reality this KV cache is a 5D tensor. The compute cache 800 in this example is a token cache for a token pipeline. The compute cache includes a predetermined number of columns which is equal to or greater than a maximum sequence length for the model. The maximum sequence length corresponds to a sum of the maximum prompt length (i.e., maximum tokens per prompt) and the maximum number of tokens that can be generated per prompt by the model. In this example, each column is used to store the computed values for one token. The inference request includes a prompt 802 having four words, or tokens, so the first four columns in the cache 800 are used to hold the computed values from the prompt cache generated by the prompt pipeline. In this example, the prompt 802 is processed by a generative transformer model having two layers: Layer 0 and Layer 1. The output of Layer 0 for the first token in the prompt therefore occupies the first three rows in the first column, and the output of Layer 1 for the first token occupies the next three rows in the first column. The output of Layer 0 and Layer 1 for the rest of the tokens in the prompt occupy corresponding positions in the next three columns. Once the prompt pipeline has completed processing the prompt 802, the output of the prompt pipeline for the prompt is stored in the compute cache 800 as shown in FIG. 6A.

FIG. 6B shows the compute cache 800 after token 804 and token 806 have been generated for the prompt. The token 804 was generated by the generative transformer model. The output of Layer 0 for token 804 occupies the first three rows of the fifth column, and the output of Layer 1 for token 804 occupies the next three rows of the fifth column. The output of Layer 0 for token 806 occupies the first three rows of the sixth column, and the output of Layer 1 for token 806 occupies the next three rows of the sixth column.

Figure 6C:
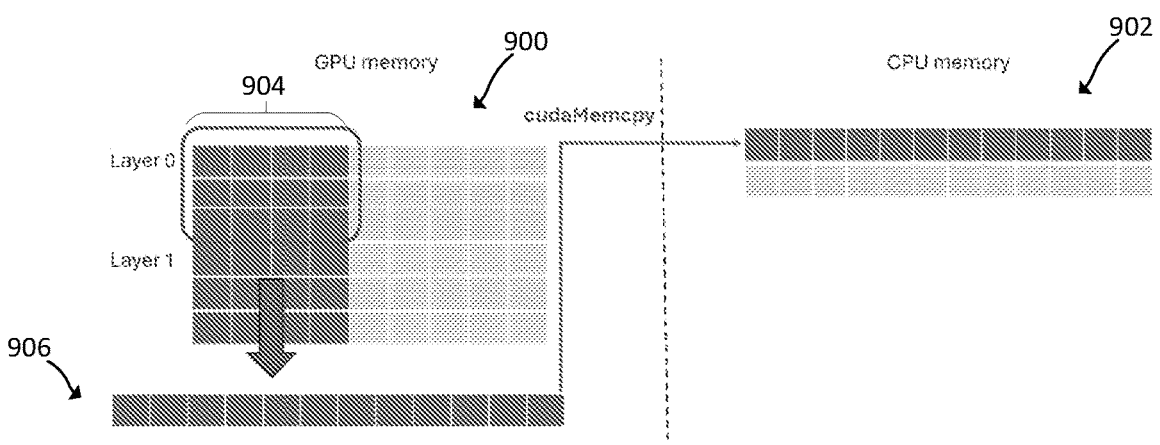
FIGS. 6C-6E show examples of streaming the prompt cache and token cache from the compute cache to persistent storage.
Figure 6D:
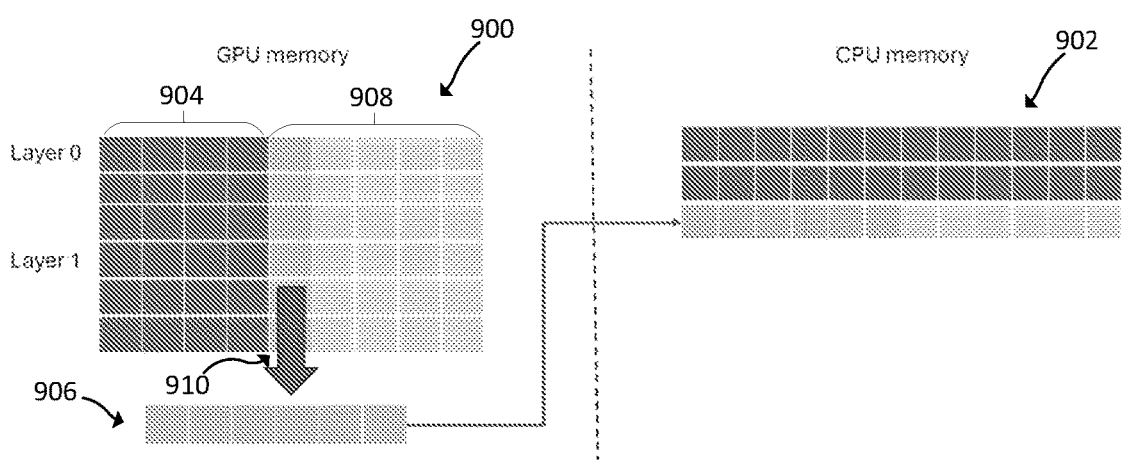
Figure 6E:
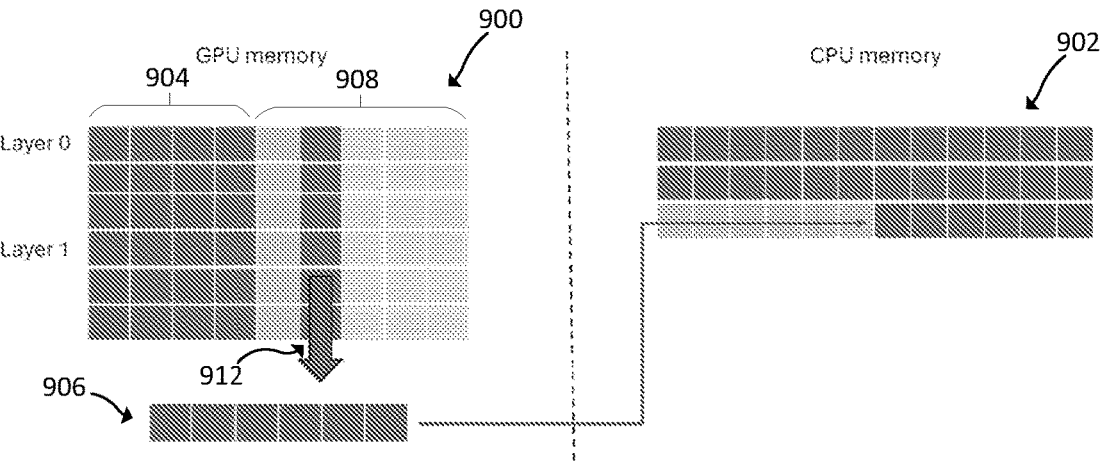

FIGS. 6C-6E demonstrate how computed values from a token cache 900 are streamed to a separate storage 902, such as a CPU memory. The values from the token cache 900 may be copied as they are added to the cache 900. In this example, the token cache 900 includes the prompt cache 904 which is stored in the first four columns. Similar to FIGS. 6A and 6B, inference requests are processed by a generative transformer model having two layers: Layer 0 and Layer 1. The output of Layer 0 for the prompt occupies the first three rows of the first four columns, and the output of Layer 1 for the prompt occupies the next three rows of the first four columns. The prompt cache 904 may be streamed layer by layer to the separate storage 902, as each the output of each layer is generated. As shown in FIG. 6C, the output of Layer 0 is streamed by copying the output of Layer 0 to an intermediate memory structure, such as a buffer 906. The buffer 906 is then copied to the storage 902. This is done as the output of each layer of the prompt pipeline is streamed to the token cache 900. Copying non-contiguous data from 904 directly to CPU memory in 902 results in poor performance; instead gathering/copying non-contiguous data from 904 to a contiguous buffer on accelerator-local memory (906) and then sequentially copying 906 to 902 results in a much faster copying of the data.

FIGS. 6D and 6E show how token portion 908 of the compute cache is streamed to a CPU memory 902. In this example, the token portion 908 corresponds to the rest of the columns of the compute cache 900. Each column in the token portion 908 holds the computed values for a respective token generated by the token pipeline. The token values 910 for a first token are stored in the fifth column, and the token values 912 for a second token generated for the prompt is stored in the sixth column of the cache 900. The token values for each token may be streamed to the memory 902 as soon as they are added to the cache 900. FIG. 6D shows the token values 910 being streamed to the storage 902. Similar to the prompt values, the token values 910 are copied to the buffer 906, and the buffer 906 is copied to the separate storage 902. FIG. 6E shows the token values 912 being streamed to the memory 902 in the same manner.

In various implementations, cache streaming is performed using gather-copy operations. A gather operation is performed to gather the appropriate values from diverse locations in the cache and generate tensors that include the gathered values. A copy operation is then performed to copy the data structure to a destination storage, such as a server memory, another GPU memory, a CPU memory, or the like. Streaming the computed values from the separate storage 902 to the cache 900 can be performed using copy-scatter operations (not shown). A copy operation is used to copy values from the separate storage 902 to a buffer. A scatter operation is then used to store computed values from the buffer in diverse memory locations in the cache. In some implementations, the copy operation is performed using a cudaMemcpy( ) function. CudaMemcpy is a CUDA function that allows data to be copied between GPU and CPU memories. Gather, copy, and scatter operations may be performed using compute kernels which are executed on the GPU.

Figure 7:
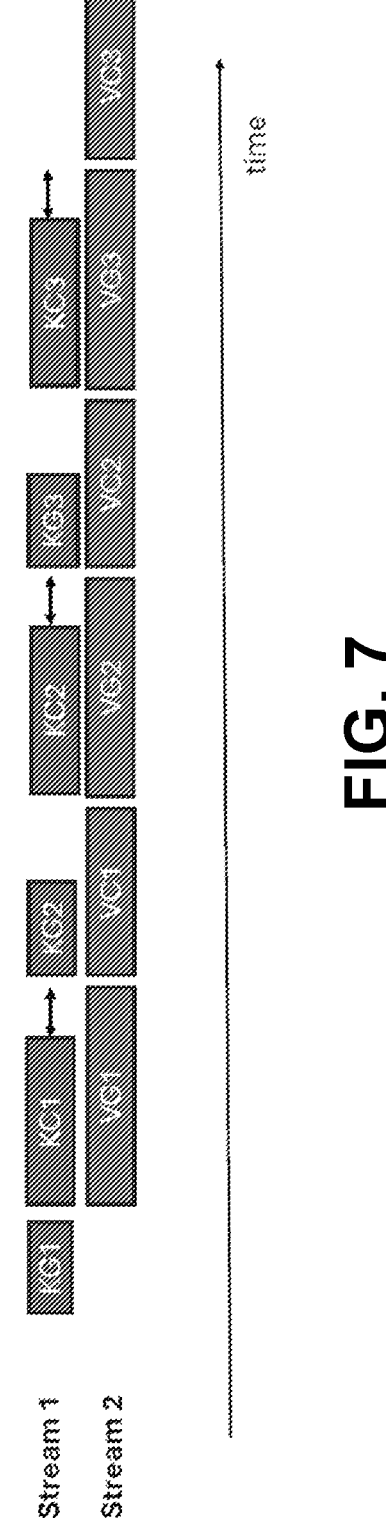
FIG. 7 shows an example timing for gather-copy operations for a Key-Value Cache.

When the compute cache corresponds to a KV cache, separate kernels are used to perform gather-copy operations for Key cache and Value cache. FIG. 7 shows an example timing for Key cache and Value cache streaming when using separate kernels. In FIG. 7, stream 1 represents Key cache streaming, and stream 2 represents Value cache streaming. Key-Gather operations are performed by a Key-gather kernel, and Value-gather operations are performed by a Value-gather kernel. Key-gather operations generate Key Cache tensors, and Value-gather operations generate Value Cache tensors. Key-copy operations copy Key Cache tensors to a destination, and Value-copy operations copy Value Cache tensors to a destination. As can be seen in FIG. 7, Key-copy operations and Value-gather operations can be performed simultaneously, and Value-copy operations and Key-gather operations can be performed simultaneously. In FIG. 7, the first Value-gather operation (VG1) overlaps with the first Key-copy operation (KC1), the first Value-copy operation (VC1) overlaps with the second Key-gather operation (KC2), and so on.

Figure 8A:
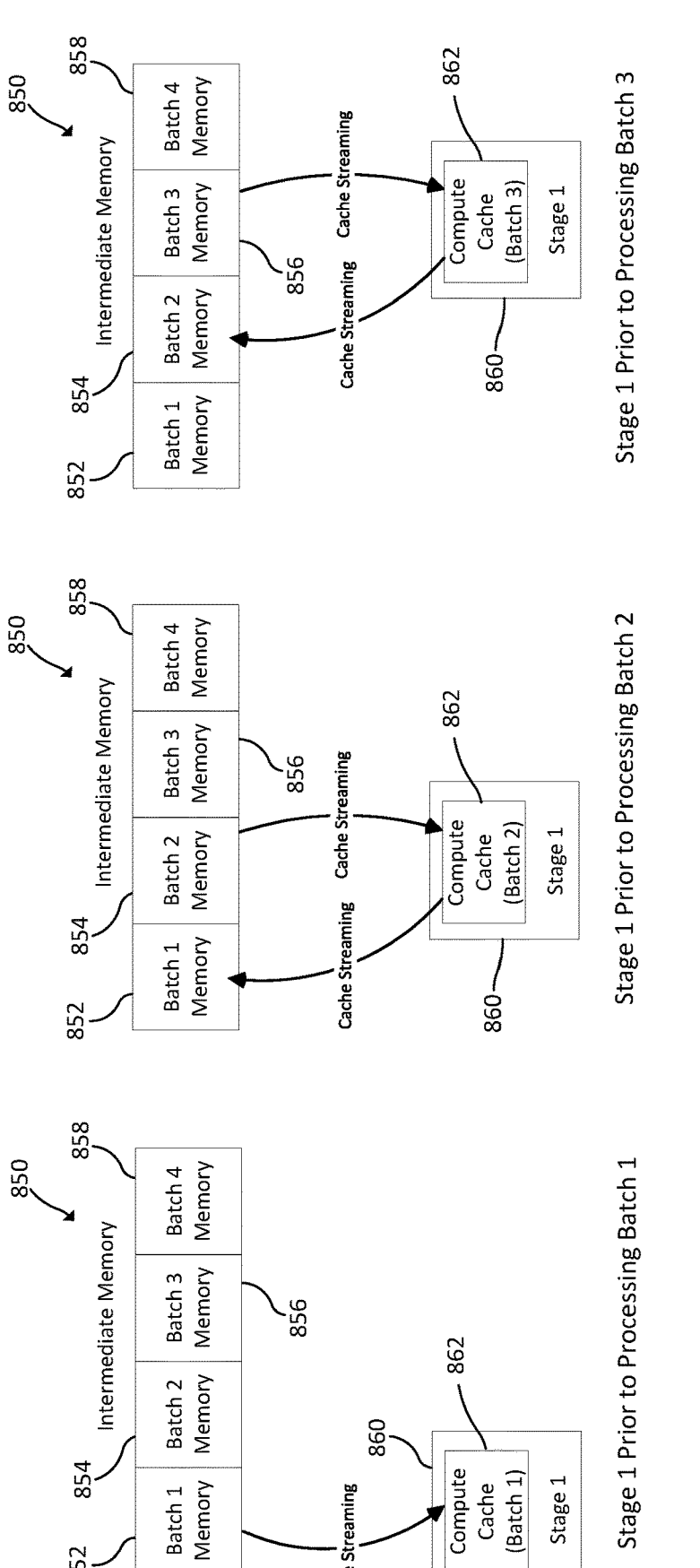
FIGS. 8A and 8B show examples of using cache streaming for cache swapping.
Figure 8B:
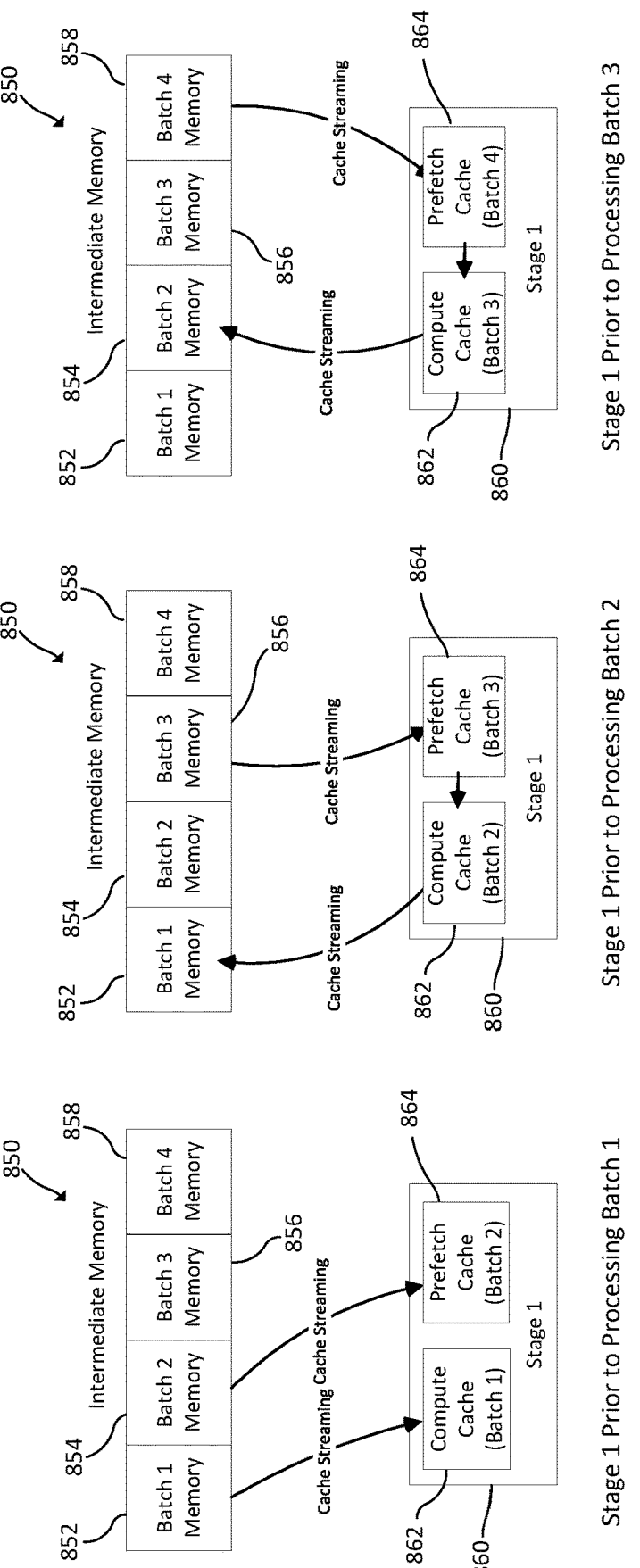

FIGS. 8A and 8B are schematic diagrams showing how cache streaming can be used to enable cache swapping for improved memory utilization. In particular, FIG. 8A schematically shows how single buffer cache swapping may be implemented while FIG. 8B shows how double buffer cache swapping may be implemented. In FIG. 8A, a token pipeline includes at least one stage 860 and an intermediate memory (e.g., swap memory) 850. The intermediate memory 850 includes separate memory sections 852, 854, 856, 858 for storing the token cache for each batch of inference requests to be processed by the pipeline. Initially, each memory section includes only the prompt cache generated by the prompt pipeline for the batch associated with each memory section. The prompt cache can be streamed to and stored in the intermediate memory 850 rather than directly to the compute cache 862. Prior to processing the first batch, e.g., Batch 1, the token cache for Batch 1 (which includes only the prompt cache at this stage) is streamed to the compute cache 862. Stage 1 then processes the token cache to generate an output. Prior to processing Batch 2 (as shown in the middle diagram of FIG. 8A), the compute cache for Batch 1 is streamed to the memory section 852 for Batch 1. The token cache for Batch 2 is then streamed to the compute cache 862 from memory section 854. The stage 860 then processes the compute cache 862 to generate an output. Prior to processing Batch 3 (as shown in the right diagram of FIG. 8A), the compute cache 862 is streamed to the memory section 854 for Batch 2. The token cache for Batch 3 in memory section 856 is then streamed to the compute cache 862. Single buffer cache swapping enables the entire cache to be used for processing each batch which significantly improves the efficiency of cache utilization relative to previous model serving systems while adding minimal latency due to having to stream the cache to and from a swap memory.

Double buffer cache swapping can be used to eliminate the latency that would otherwise result from having to stream cache to and from of a swap memory. Referring to FIG. 8B, double buffer cache swapping is implemented by dividing the cache for the stage of the token pipeline into a compute cache 862 and a prefetch cache 864. The compute cache 862 is used to hold the token cache for the batch that is currently being processed at the pipeline stage. The prefetch cache 864 is used to hold the token cache for the next batch that is to be processed by the pipeline stage. Prior to processing Batch 1, the token cache for Batch 1 is streamed from the memory section 852 to the compute cache and the token cache for Batch 2 is streamed from memory section 854 to the prefetch cache 864. Stage 1 processes the compute cache to generate an output. Prior to processing Batch 2, the compute cache 862 is streamed out to memory section 852 for Batch 1. The contents of the prefetch cache 864 (i.e., token cache for Batch 2) is copied over to the compute cache 862. The token cache for Batch 3 is then streamed from memory section 856 to the prefetch cache 864. As seen in the right diagram of FIG. 8B, prior to processing Batch 3, the compute cache (including the token cache for Batch 2) is streamed to the memory section 854 for Batch 2. The prefetch cache 864 (including the token cache for Batch 3) is then copied over to the compute cache 862. The token cache for Batch 4 is then be streamed from memory section 858 to the prefetch cache 864.

FIG. 9 shows an example method for serving a generative transformer model that includes cache streaming and separation of prompt and token pipelines. The method includes receiving a plurality of inference requests for a generative transformer model (block 1102) and determining a batch size to use in processing the inference requests (block 1104). A number of prompt pipelines, a number of token pipelines, and depths of the pipelines are determined based on the batch size, an average prompt length, and a memory requirement per stage (block 1106). A first batch is then processed through a first prompt pipeline to generate prompt output (block 1108) which is stored in a prompt cache (block 1110). The prompt output is streamed from the prompt cache to a token cache a first token pipeline (block 1112). The prompt output is processed through the token pipeline to generate token output (block 1114) which is appended to the token cache. The token cache is then streamed to a separate storage (block 1116).

Figure 10:
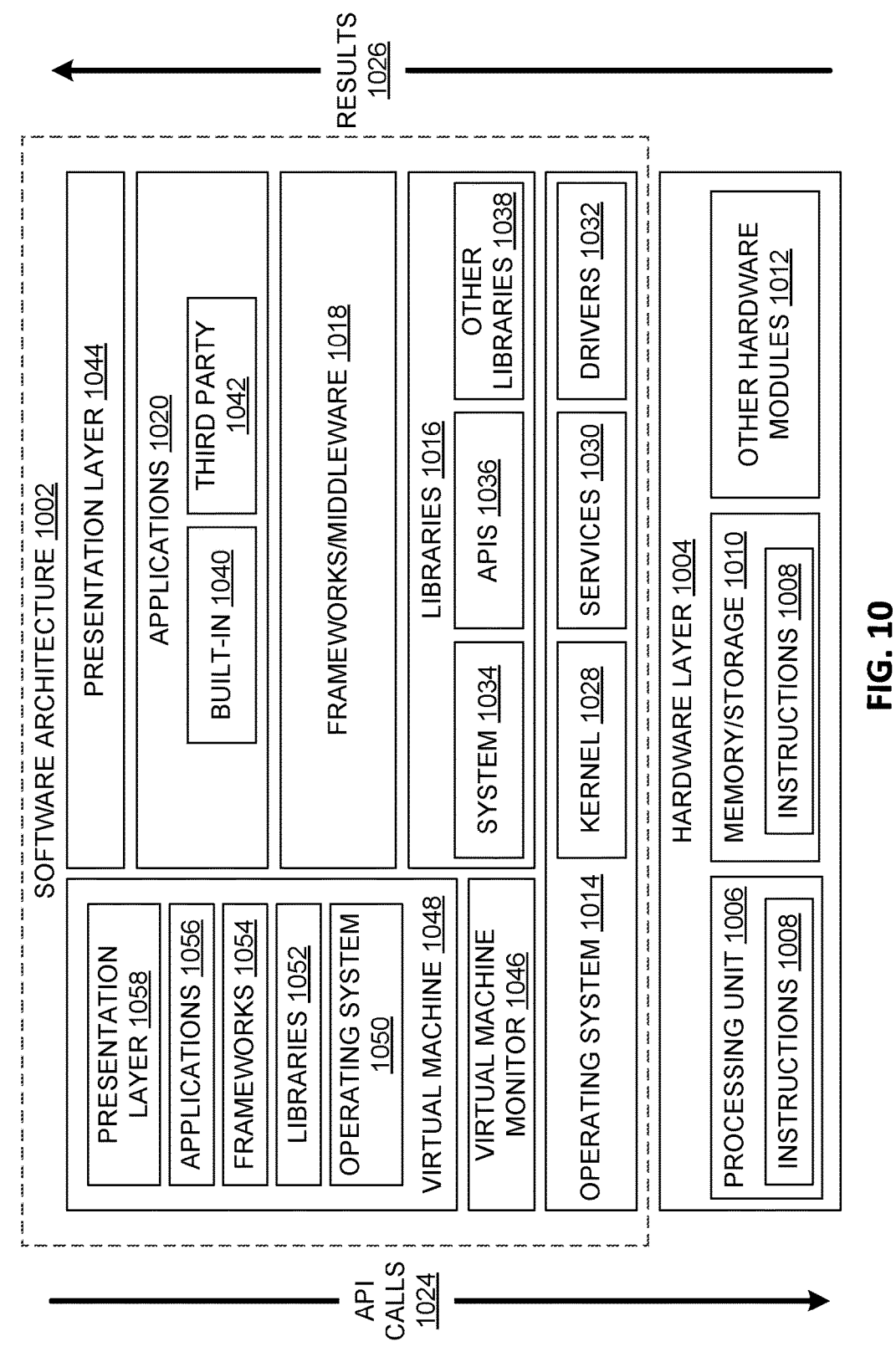
FIG. 10 is a block diagram showing an example software architecture, various portions of which may be used in conjunction with various hardware architectures herein described, which may implement any of the described features.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture, and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1006 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1100 of FIG. 11, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1050, libraries 1052, frameworks 1054, applications 1056, and/or a presentation layer 1058.

Figure 11:
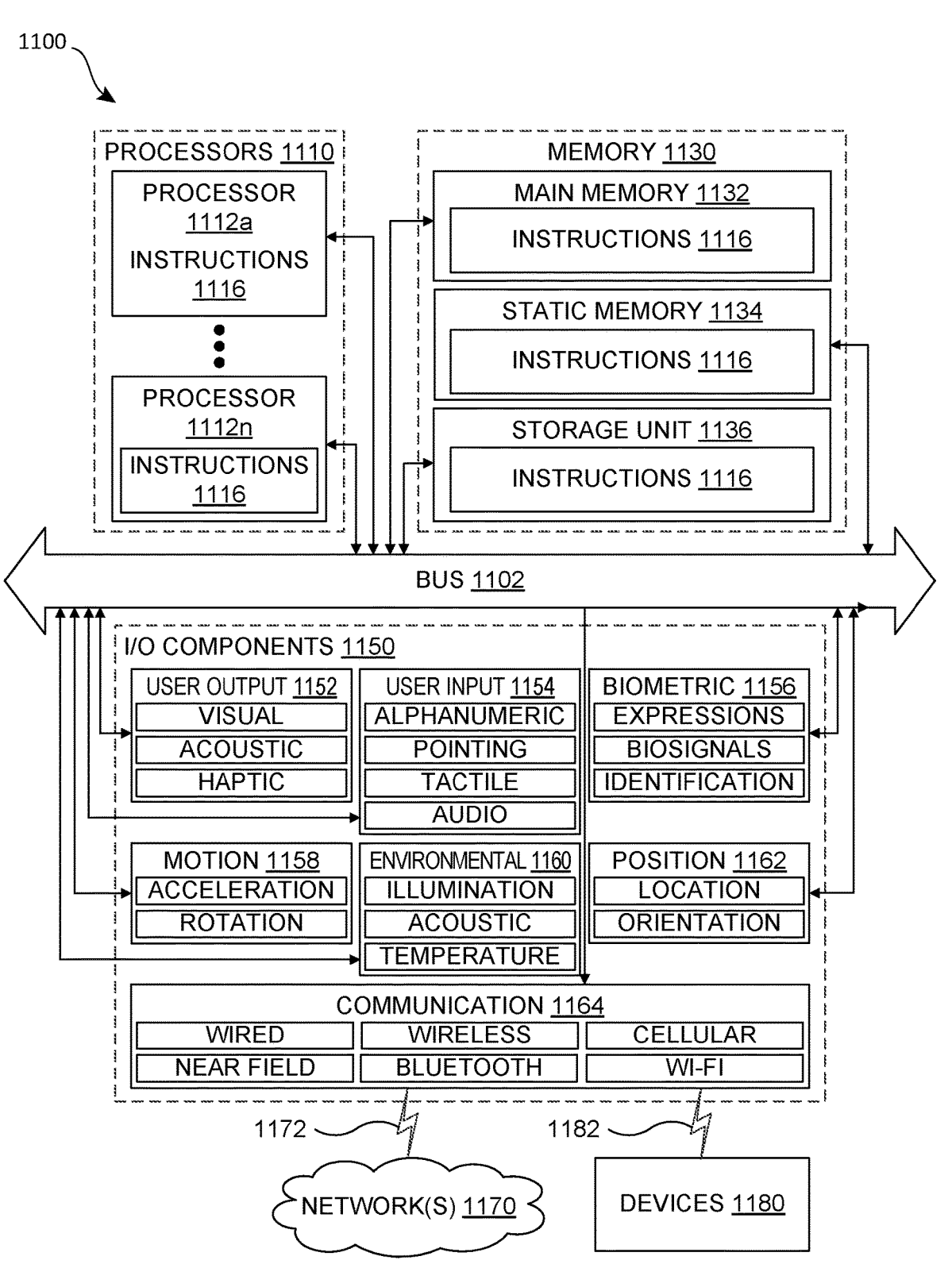
FIG. 11 is a block diagram showing components of an example machine configured to read instructions from a machine-readable medium and perform any of the features described herein.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112a to 1112n that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1116) for execution by a machine 1100 such that the instructions, when executed by one or more processors

1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156, motion components 1158, environmental components 1160, and/or position components 1162, among a wide array of other physical sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1164, such as, but not limited to, geo-location via Internet Protocol (IP) address, location via $W_i$-Fi, cellular, NFC, Bluetooth, or other wireless station identification and/or signal triangulation.

In the following, further features, characteristics and advantages of the invention will be described by means of items:

Item 1. A model serving system comprising:

a processor; and a memory in communication with the processor, the memory comprising executable instructions that, when executed by the processor alone or in combination with other processors, cause the model serving system to perform functions of:

receiving a plurality of inference requests for a generative transformer model;

determining a batch size to use in processing the inference requests;

allocating a prompt pipeline and a token pipeline to the generative transformer model to process the batch of inference requests;

dispatching a batch of inference requests of the batch size to the prompt pipeline;

processing a first prompt from the batch of inference requests through the prompt pipeline to generate a prompt output for the first prompt;

storing the prompt output in a first compute cache;

streaming the prompt output from the first compute cache to a first stage of the token pipeline;

processing the prompt output through the token pipeline to generate a token output for the first prompt; and outputting the token output to a result processing component of the model serving system.

Item 2. The model serving system of item 1, wherein the functions further comprise:

storing the token output in a second compute cache; and streaming the token output from the second compute cache to a remote memory or a persistent storage.

Item 3. The model serving system of any of items 1-2, wherein the functions further comprise:

in response to detecting a fault or failure causing the token output in the second compute cache to be cleared and/or corrupted, streaming the token output from the remote memory or the persistent storage to the second compute cache.

Item 4. The model serving system of any of items 1-3, wherein the token output includes the prompt output.

Item 5. The model serving system of any of items 1-4, wherein the streaming of the second compute cache further comprises:

performing a gather operation to gather the prompt output and the token output from the second compute cache into a tensor, and performing a copy operation to copy the tensor to the remote memory or the persistent storage.

Item 6. The model serving system of any of items 1-5, wherein the gather operation and the copy operation are performed using compute kernels.

Item 7. The model serving system of any of items 1-6, wherein:

the first compute cache and the second compute cache each comprise a Key-Value Cache, the Key-Value Cache including a Key Cache and a Value Cache, the Key cache being used to store output of token pipelines, and the Value cache being used to store output of prompt pipelines.

Item 8. The model serving system of any of items 1-7, further comprising:

determining a number of prompt pipelines, a number of stages per prompt pipeline, a number of token pipelines, and a number of stages per token pipeline to utilize for the generative transformer model based on the batch size, an average prompt length, a cache requirement per stage, and a memory footprint of model weights for the generative model per stage using a resource allocator component of the model serving system.

Item 9. The model serving system of any of items 1-8, wherein:

the generative transformer model includes a plurality of transformer layers, and determining the number of prompt pipelines, the number of stages per prompt pipeline, the number of token pipelines, and the number of stages per token pipeline includes determining a number of transformer layers per stage for the prompt pipelines and the token pipelines.

Item 10. A method of serving a generative transformer model, the method comprising:

receiving a plurality of inference requests for the generative transformer model;

storing compute values for the plurality of inference requests in an intermediate memory for a first pipeline stage;

streaming the compute values for a first batch of inference requests from the intermediate memory to a cache of the first pipeline stage;

processing the compute values for the first batch of inference requests at the first pipeline stage to generate new compute values for the first batch of inference requests;

streaming the new compute values for the first batch of inference requests from the cache to the intermediate memory;

streaming the compute values for a second batch of inference requests from the intermediate memory to the cache;

processing the compute values for the second batch of inference requests at the first pipeline stage to generate new compute values for the second batch of inference requests; and streaming the new compute values for the second batch of inference requests from the cache to the intermediate memory.

Item 11. The method of item 10, further comprising:

streaming the compute values for a third batch of inference requests from the intermediate memory to the cache; and processing the compute values for the third batch of inference requests at the first pipeline stage to generate new compute values for the third batch of inference requests; and streaming the new compute values for the third batch of inference requests from the cache to the intermediate memory.

Item 12. The method of any of items 10-11, wherein:

the cache includes a compute cache and a prefetch cache, and prior to processing the compute values for the first batch of inference requests, the compute values for the first batch of inference requests are streamed from the intermediate memory to the compute cache and the compute values for the second batch of inference requests are streamed from the intermediate memory to the prefetch cache, and prior to processing the compute values for the second batch of inference requests, the compute values for the second batch of inference requests are copied from the prefetch cache to the compute cache and the compute values for the third batch of inference requests are streamed from the intermediate memory to the prefetch cache.

Item 13. The method of any of items 10-12, further comprising:

after receiving the plurality of inference requests, processing the plurality of inference requests using a prompt pipeline to generate the compute values, each of the compute values being representative of a prompt of an inference request;

storing the compute values in a prompt cache; and streaming the compute values from the prompt cache to the intermediate memory, Item 14. The method of any of items 10-13, wherein:

the first pipeline stage is for a token pipeline that is separate from the prompt pipeline.

Item 15. The method of any of items 10-14, wherein the cache comprises a Key-Value Cache.

Item 16. A method of serving a generative transformer model, the method comprising:

storing compute values for a first batch of inference requests of the plurality of inference requests in a first memory for a first pipeline, the first pipeline corresponding to at least one transformer layer of the generative transformer model;

processing the compute values for the first batch of inference requests through the first pipeline to generate new compute values for the first batch of inference requests; and while the compute values for the first batch of inference requests are being processed at the stage of the first pipeline, streaming the compute values from the first memory to a second memory or storage.

Item 17. The method of item 16, wherein:

the first pipeline is a prompt pipeline, the first memory is a prompt cache, the compute values correspond to prompt inputs for the prompt pipeline, and the second memory is for a token pipeline that is separate from the prompt pipeline.

Item 18. The method of any of items 16-17, wherein:

the prompt pipeline implements a plurality of transformer layers for the generative transformer model, each of the transformer layers processes the prompt cache to generate an output that is added to the prompt cache, the output of each transformer layer is streamed to the second memory while a next transformer layer processes the prompt cache.

Item 19. The method of any of items 16-18, wherein:

the first pipeline is a token pipeline, the first memory is a token cache, and the second memory is a remote memory and/or persistent storage used for fault recovery.

Item 20. The method of any of items 16-19, wherein:

the token cache is streamed to the remote memory and/or persistent storage while the token cache is being processed by the token pipeline to generate next computed values for the first batch of inference requests.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A model serving system comprising:
a processor; and
a memory in communication with the processor, the memory comprising executable instructions that, when executed by the processor alone or in combination with other processors, cause the model serving system to perform functions of:
receiving a plurality of inference requests for a generative transformer model;
determining a batch size to use in processing the plurality of inference requests;
allocating a prompt pipeline and a token pipeline to the generative transformer model to process the plurality of inference requests;
dispatching a batch of inference requests of the batch size to the prompt pipeline;
processing a first prompt from the batch of inference requests through the prompt pipeline to generate a prompt output for the first prompt;
storing the prompt output in a first compute cache;
streaming the prompt output from the first compute cache to a first stage of the token pipeline;
processing the prompt output through the token pipeline to generate a token output for the first prompt; and
outputting the token output to a result processing component of the model serving system.

2. The model serving system of claim 1, wherein the functions further comprise:
storing the token output in a second compute cache; and
streaming the token output from the second compute cache to a remote memory or a persistent storage.

3. The model serving system of claim 2, wherein the functions further comprise:
in response to detecting a fault or failure causing the token output in the second compute cache to be cleared and/or corrupted, streaming the token output from the remote memory or the persistent storage to the second compute cache.

4. The model serving system of claim 2, wherein the token output includes the prompt output.

5. The model serving system of claim 4, wherein the streaming of the second compute cache further comprises:
performing a gather operation to gather the prompt output and the token output from the second compute cache into a tensor, and
performing a copy operation to copy the tensor to the remote memory or the persistent storage.

6. The model serving system of claim 5, wherein the gather operation and the copy operation are performed using compute kernels.

7. The model serving system of claim 2, wherein:
the first compute cache and the second compute cache each comprise a Key-Value Cache, the Key-Value Cache including a Key Cache and a Value Cache, the Key cache being used to store output of token pipelines, and the Value cache being used to store output of prompt pipelines.

8. The model serving system of claim 1, further comprising:
determining a number of prompt pipelines, a number of stages per prompt pipeline, a number of token pipelines, and a number of stages per token pipeline to utilize for the generative transformer model based on the batch size, an average prompt length, a cache requirement per stage, and a memory footprint of model weights for the generative transformer model per stage using a resource allocator component of the model serving system.

9. The model serving system of claim 8, wherein:
the generative transformer model includes a plurality of transformer layers, and
determining the number of prompt pipelines, the number of stages per prompt pipeline, the number of token pipelines, and the number of stages per token pipeline includes determining a number of transformer layers per stage for the prompt pipelines and the token pipelines.

10. A method of serving a generative transformer model, the method comprising:
receiving a plurality of inference requests for the generative transformer model;
processing the plurality of inference requests using a prompt pipeline to generate compute values, each of the compute values being representative of a prompt of an inference request:
storing the compute values for the plurality of inference requests in an intermediate memory for a first pipeline stage, the first pipeline stage corresponding to a token pipeline that is separate from the prompt pipeline;
streaming the compute values for a first batch of inference requests from the intermediate memory to a cache of the first pipeline stage;

processing the compute values for the first batch of inference requests at the first pipeline stage to generate new compute values for the first batch of inference requests;

streaming the new compute values for the first batch of inference requests from the cache to the intermediate memory;

streaming the compute values for a second batch of inference requests from the intermediate memory to the cache;

processing the compute values for the second batch of inference requests at the first pipeline stage to generate new compute values for the second batch of inference requests; and streaming the new compute values for the second batch of inference requests from the cache to the intermediate memory.

11. The method of claim 10, further comprising:

streaming the compute values for a third batch of inference requests from the intermediate memory to the cache; and processing the compute values for the third batch of inference requests at the first pipeline stage to generate new compute values for the third batch of inference requests; and streaming the new compute values for the third batch of inference requests from the cache to the intermediate memory.

12. The method of claim 11, wherein:

the cache includes a compute cache and a prefetch cache, and prior to processing the compute values for the first batch of inference requests, the compute values for the first batch of inference requests are streamed from the intermediate memory to the compute cache and the compute values for the second batch of inference requests are streamed from the intermediate memory to the prefetch cache, and prior to processing the compute values for the second batch of inference requests, the compute values for the second batch of inference requests are copied from the prefetch cache to the compute cache and the compute values for the third batch of inference requests are streamed from the intermediate memory to the prefetch cache.

13. The method of claim 12, further comprising:

after receiving the plurality of inference requests, storing the compute values in a prompt cache; and streaming the compute values from the prompt cache to the intermediate memory.

14. The method of claim 10, wherein the cache comprises a Key-Value Cache.

15. A method of serving a generative transformer model, the method comprising:

storing compute values for a first batch of inference requests in a first memory for a first pipeline, the first pipeline corresponding to at least one transformer layer of the generative transformer model;

processing the compute values for the first batch of inference requests through the first pipeline to generate new compute values for the first batch of inference requests; and while the compute values for the first batch of inference requests are being processed at the first pipeline, streaming the compute values from the first memory to a second memory for storage, wherein:

the first pipeline is a prompt pipeline, the first memory is a prompt cache, the compute values correspond to prompt inputs for the prompt pipeline, and the second memory is for a token pipeline that is separate from the prompt pipeline.

16. The method of claim 15, wherein:

the prompt pipeline implements a plurality of transformer layers for the generative transformer model, each of the transformer layers processes the prompt cache to generate an output that is added to the prompt cache, the output of each transformer layer is streamed to the second memory while a next transformer layer processes the prompt cache.

17. The method of claim 15, wherein:

the second memory is a remote memory and/or persistent storage used for fault recovery.

18. The method of claim 17, wherein:

a token cache is streamed to the remote memory and/or persistent storage while the token cache is being processed by the token pipeline to generate next computed values for the first batch of inference requests.

* * * * *